US009223021B2

(12) United States Patent
Goldman

(10) Patent No.: US 9,223,021 B2
(45) Date of Patent: Dec. 29, 2015

(54) METHOD AND SYSTEM FOR MOTION COMPENSATED TARGET DETECTION USING ACOUSTICAL FOCUSING

(71) Applicant: U.S. Army Research Laboratory, Washington, DC (US)

(72) Inventor: Geoffrey Howard Goldman, Ellicott City, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 597 days.

(21) Appl. No.: 13/657,844

(22) Filed: Oct. 22, 2012

(65) Prior Publication Data

US 2014/0112103 A1 Apr. 24, 2014

(51) Int. Cl.
*G01S 15/00* (2006.01)
*G01S 15/66* (2006.01)
*G01S 3/80* (2006.01)
*G01S 5/18* (2006.01)

(52) U.S. Cl.
CPC .............. *G01S 15/66* (2013.01); *G01S 3/8006* (2013.01); *G01S 5/18* (2013.01)

(58) Field of Classification Search
CPC ............. G01S 5/22; G01S 15/66; G01S 5/18; G01S 3/8006
See application file for complete search history.

(56) References Cited

U.S. PATENT DOCUMENTS

2008/0291286 A1* 11/2008 Fujiyama et al. .......... 348/222.1

OTHER PUBLICATIONS

Rong IEEE Transaction on Aerospace and electronic systems vol. 39, No. 4 Oct. 2003, pp. 1333-1364.*
Ramadan Journal of telecommunications and information technology Jan. 2010 pp. 40-47.*
Barbarossa "Detection and imaging of moving objects with SAR, Part 2; Joint time-frequency analysis by Wigner-Ville distribution (WVD)" IEE Proceedings, Pt. F, 139, 1 (Feb. 1992) pp. 89-97.*
Wahl IEEE Transaction on Aerospace and Electronic System, vol. 30 No. 3 Jul. 1994 pp. 827-835.*
Loughlin Proceeding of the IEEE-SP International Symposium on Time-Frequency and Time-Scale Analysis, Oct. 6-8, 1998 pp. 97-100.*
T. Pham and B. M. Sadler, "Wideband array processing algorithms for acoustic tracking of ground vehicles," Proc. 21th Army Science Conference, 1998.

(Continued)

*Primary Examiner* — Luke Ratcliffe
*Assistant Examiner* — Hovhannes Baghdasaryan
(74) *Attorney, Agent, or Firm* — Lawrence E. Anderson

(57) ABSTRACT

An improved method and system for removing time-varying Doppler shifts and the effects of turbulence from data comprising at least one processor operating to estimate the average instantaneous frequency; reduce or remove noise from the state space variables estimates describing the frequency of the target; compensate for the motion of the target to obtain motion compensated data and increase the coherency of the data, and reduce or remove the noise from the state space variables describing the frequency of the target using a filter or smoother. Alternately, the method and system may comprise at least one processor operating to estimate the average instantaneous frequency of the first harmonic of a moving target; the average instantaneous frequency being inputted into an error reduction subroutine; using state space estimates of the frequency, calculating a time warping to remove the effect of the Doppler shift; and focusing the data using a modified PGA.

18 Claims, 20 Drawing Sheets

(56) References Cited

OTHER PUBLICATIONS

Robert A. Hauslen, "The Promise of Automatic Vehicle Identification" IEEE Transactions on Vehicular Technology, vol. 26, No. 1, Feb. 1977.

M. Wellman, N. Srour, and D. Hillis, "Acoustic feature extraction for a neural network classifier," Army Research Laboratory, ARL-TR-1166, Jan. 1997.

N. Srour and J. Robertson, "Remote netted acoustic detection system: Final report," Army Research Laboratory, ARL-TR-706, Apr. 1995.

V.C. Ravindra, Y. Bar-Shalom, T. Damarla, "Feature-aided localization of ground vehicles using passive acoustic sensor arrays," 12th International Conference on Information Fusion, pp. 70-77, 2009.

Lake, Douglas, "Harmonic Phase Coupling for Battlefield Acoustic Target Identificaton," Acoustics, Speech and Signal Processing, 1998. Proceedings of the 1998 IEEE International Conference on , vol. 4: 4 pp. 2049-2052 Digital Object Identifier: 10.1109/ICASSP.1998.681546.

T.R. Damarla, T. Pham and D. Lake, "An algorithm for classifying multiple targets using acoustic signature," in Proc. SPIE Sig. Proc., Sensor Fusion and Targ. Recognition, pp. 421-427, 2004.

B.G. Ferguson and G.C. Speechley, "Time-varying spectral analysis and spatial array processing of acoustic data from a microphone array", Proc. 3rd International Symposium on Signal Processing and its Applications, Gold Coast, Australia, vol. 2, pp. 408-411, Aug. 1992.

Pertilä, Parviainen, Korhonen Visa, "Moving Sound Source Localization in Large Areas", International Symposium on Intelligent Signal Processing and Communication Systems, pp. 745-748, 2005.

C. W. Sherwin, J. P. Ruina, and R. D. Rawcliffe, "Some early developments in synthetic aperture radar systems," IRE Trans. vol. MIL-6, pp. 111-115, Apr. 1962.

D. A. Aushemnan, A. Kozma, J. L. Walker, H. M. Jones, and E. C. Poggio, "Developments in radar imaging," IEEE Transactions on Aerospace and Electronic Systems, vol. 20, No. 4, pp. 363-400, 1984.

K. W. Lo and B. G. Ferguson, "Time frequency signal analysis of ground vehicle acoustic signatures", Proc. Information, Decision and Control IDC 2002, Adelaide, Australia, pp. 301-304, Feb. 2002.

B. G. Ferguson, "Doppler effect for sound emitted by a moving airborne source and received by acoustic sensors located above and below the sea surface", J. Acoust. Soc. Am., vol. 94, pp. 3244-3247, Dec. 1993.

B.G. Ferguson, "Application of narrowband and broadband signal processing techniques to the acoustic detection and localization of aircraft", J. Acoust. Soc. Am., vol. 98, No. 5. Pt. 2, pp. 2969, Nov. 1995.

F. M. Dommermuth, "A simple procedure for tracking fast maneuvering aircraft using spatially distributed acoustic sensors," J. Acoust. Soc. Am., vol. 82, pp. 1418-1424, 1987.

B. Xerri, J.-F. Cavassilas and B. Borloz, "Passive tracking in underwater acoustics", Elsevier Signal Process, pp. 1067-1085, 2002.

I. Schumacher, G.J. Heard, "Removal of time-varying Doppler using phase tracking with application to ocean warming measurements" Acoust. Soc. Am. vol. 96, No. 3, pp. 1805-1812, 1994.

M.G. Christensen, A. Jakobsson, Multi-Pitch Estimation (Synthesis Lectures on Speech and Audio Processing), Morgan & Claypool Publishers, vol. 5, No. 1. 2009.

L.M. Kaplan, Q. Le, and P. Molnár. "Maximum Likelihood Methods for Bearings-only Target Localization" Proc. ICASSSP. Salt Lake City, UT. pp. 554-557, 2001.

G.H. Goldman, "Fourier based Techniques for Tracking Helicopters with Acoustic Arrays", Battlespace Acoustics and Magnetic Sensors, 2009.

Eichel, P.H., et al., "Phase Gradient Algorithm as an Optimal Estimator of the Phase Derivative," Optics Letters, vol. 14, No. 20, 1101-1103 (1989).

Eichel, P., et al., "Speckle Processing Method for Synthetic Aperture Radar Phase Correction," Optics Letters, vol. 14, 1101-1103 (1989).

Sharif, B.S., "A Computationally Efficient Doppler Compensation System for Underwater Acoustic Communications," IEEE J. Oceanic Eng. 25 (1)(2000).

Skode, F. "Windscreening of Outdoor Microphones," Bruel and Kjer Tech REv. 1, (1966).

Gerhard. D. "Pitch Extraction and Fundamental Frequency; History and Currrent Techniques," Tech. Report TR-CS Jun. 2003 (Department of Computer Science, University of Regina (2003).

Li, R. et al., "Survey of Maneuvering target tracking, Part 1: Dynamic Models," IEEE TRans. on AES 39, 1333-1364 (2003).

Collier, S.L., et al., "Performance Bounds for Passive Sensor Arrays Operating in a Turbulent Medium: Plane Wave Analysis" J. Accoust. Soc. Am. 113, 2704-2718 (2003).

Anderson, A.B.D.O., et al. Optimal Filtering, (Prentice Hall, Englewood Cliffs, N.J. 19790) Chap. 7.

Ferguson, B., et al.. "Passive Wideband Cross Correlation with Differential Doppler Compensation Using the Continuous Wavelet Transform," Journal of Acoustic Society of America, vol. 106, No. 6, 3434-3444, 1999.

\* cited by examiner

Estimates of the average instantaneous frequency of a rotorcraft.

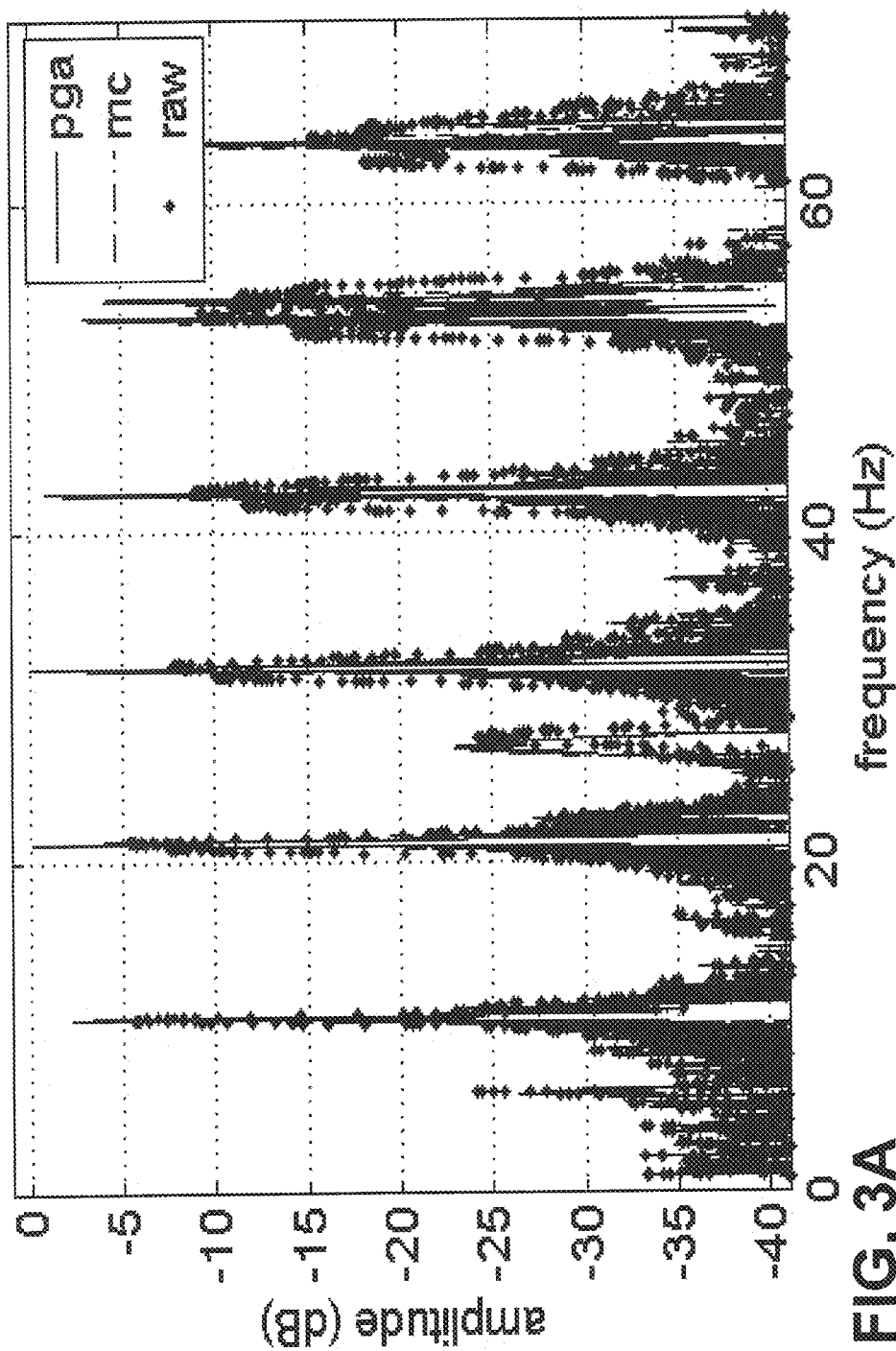
FIG. 3A The spectrum of a rotorcraft calculated using 8.2 s of data.

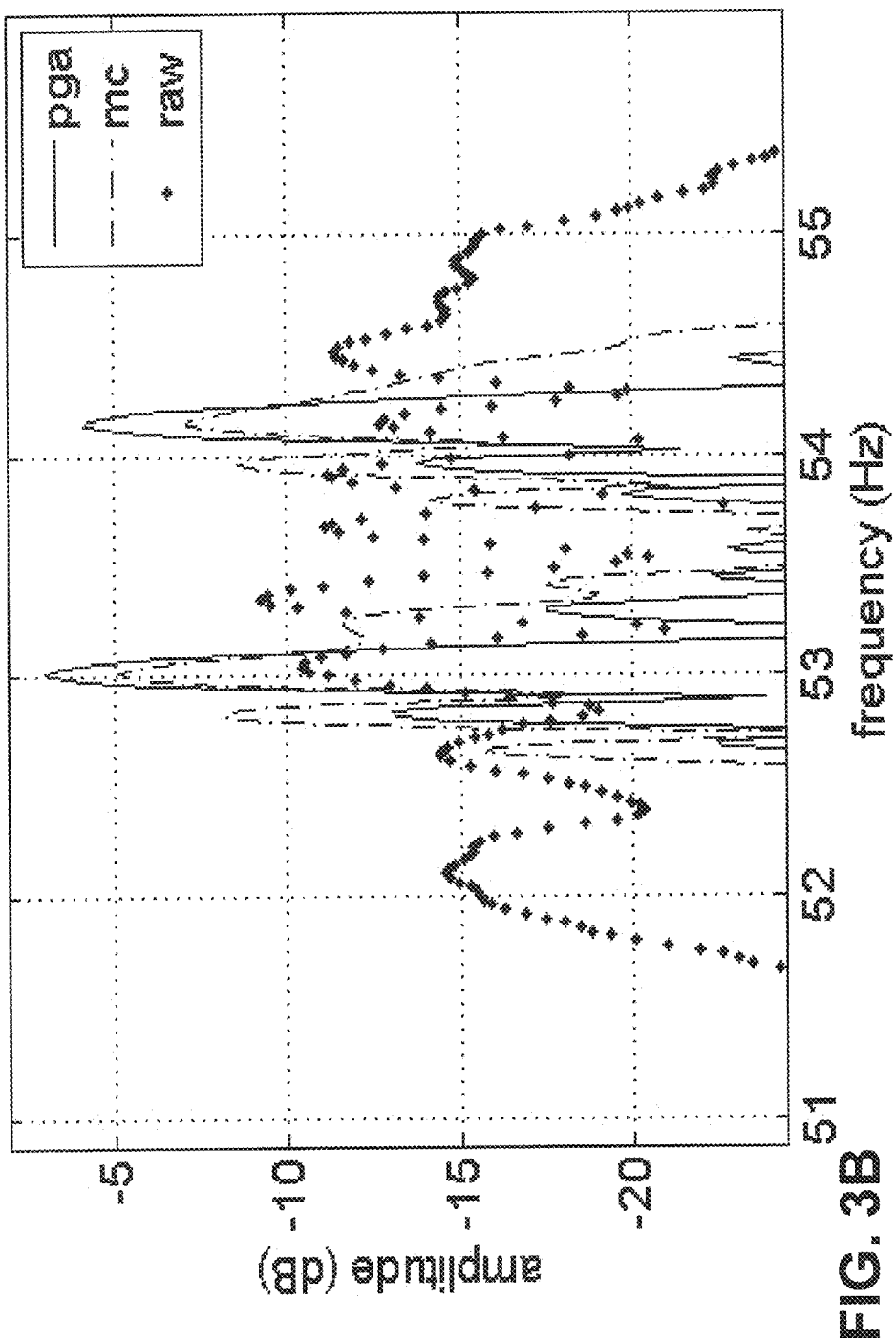
FIG. 3B Zoomed in spectrum of a rotorcraft near the 5th harmonic calculated using 8.2 s of data.

Percentage of the spectra in which the peak levels increased for four harmonics.

Percentage of the spectra in which the peak levels increased for four harmonics. PGA algorithm is based upon only the 3rd harmonic.

Smoother

FIG. 7B    Smoother for the Fundamental Frequency

12' →

Fixed lag smoother with a lag of 1 sample $\dot{\vec{x}}(t) = A\vec{x}(t) + B\vec{u}(t)$    white-noise jerk model $A = \begin{bmatrix} 0 & 1 & 0 \\ 0 & 0 & 1 \\ 0 & 0 & 0 \end{bmatrix}$    $B = \begin{bmatrix} 0 \\ 0 \\ 1 \end{bmatrix}$ $y(t) = Hx(t) + noise$    Average instantaneous frequency $H = [1 \quad T/2 \quad T^2/6]$

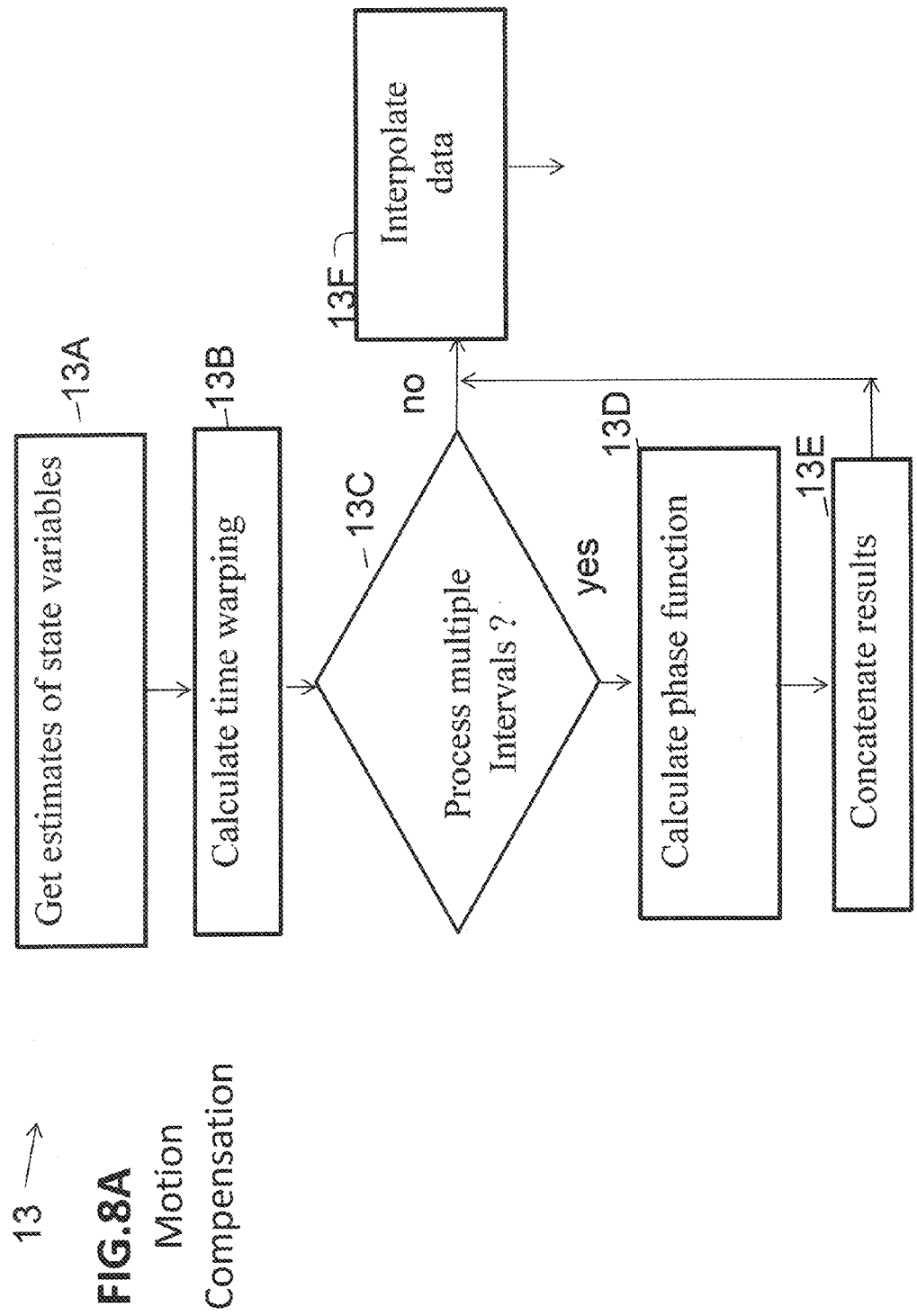
FIG. 8A Motion Compensation

FIG. 8B     Motion compensation

13' →

$$h(t) = d(m(t)) \text{ where } m(t) = \kappa(t)^{-1}$$

Equivalent method for constant amplitude signals that is easier to implement. →

Resample waveform at $$\gamma(n) = \frac{n\Delta t \left(1 + \frac{Bn\Delta t}{\omega_0} + \frac{C}{\omega_0}(n\Delta t)^2\right)}{\left(1 + \frac{B}{\omega_0}((N-1)\Delta t) + \frac{C}{\omega_0}((N-1)\Delta t)^2\right)}$$

where $N$ is number of samples in a processing interval and $1/\Delta t$ is the sample rate for the analog-to-digital converter (ADC).

13F

For Fs >> FT, resampling can be implemented using interpolation.

FIG. 8C Time scale of data can be Warped

13B $$G_{i,M,N}(\cdot) = (g_{i,i,N}(\cdot) \mid g_{i,i+1,N}(\cdot) \mid \ldots \mid g_{i,i+I-1,N}(\cdot))$$

where $$g_{i,j,N}(n) = \left( n\Delta t \left( \frac{\omega_{0,j}}{\omega_{0,i}} + \frac{B_j}{\omega_{0,i}} n\Delta t + \frac{C_j}{\omega_{0,i}} (n\Delta t)^2 \right) + \frac{\Gamma_{i,j}}{\omega_{0,i}} \right) / K_2$$

for $n=0,\ldots,N-1$, $$\Gamma_{i,j} = \sum_{k=i}^{k=j-1} \Psi_k$$

where $i$ is the starting processing interval of interest, $M$ is the number of processing intervals combined, $N$ is the number of samples in the shorter processing interval, | represents concatenation, and the dimensions of $G_{i,M,N}$ are $MN \times 1$

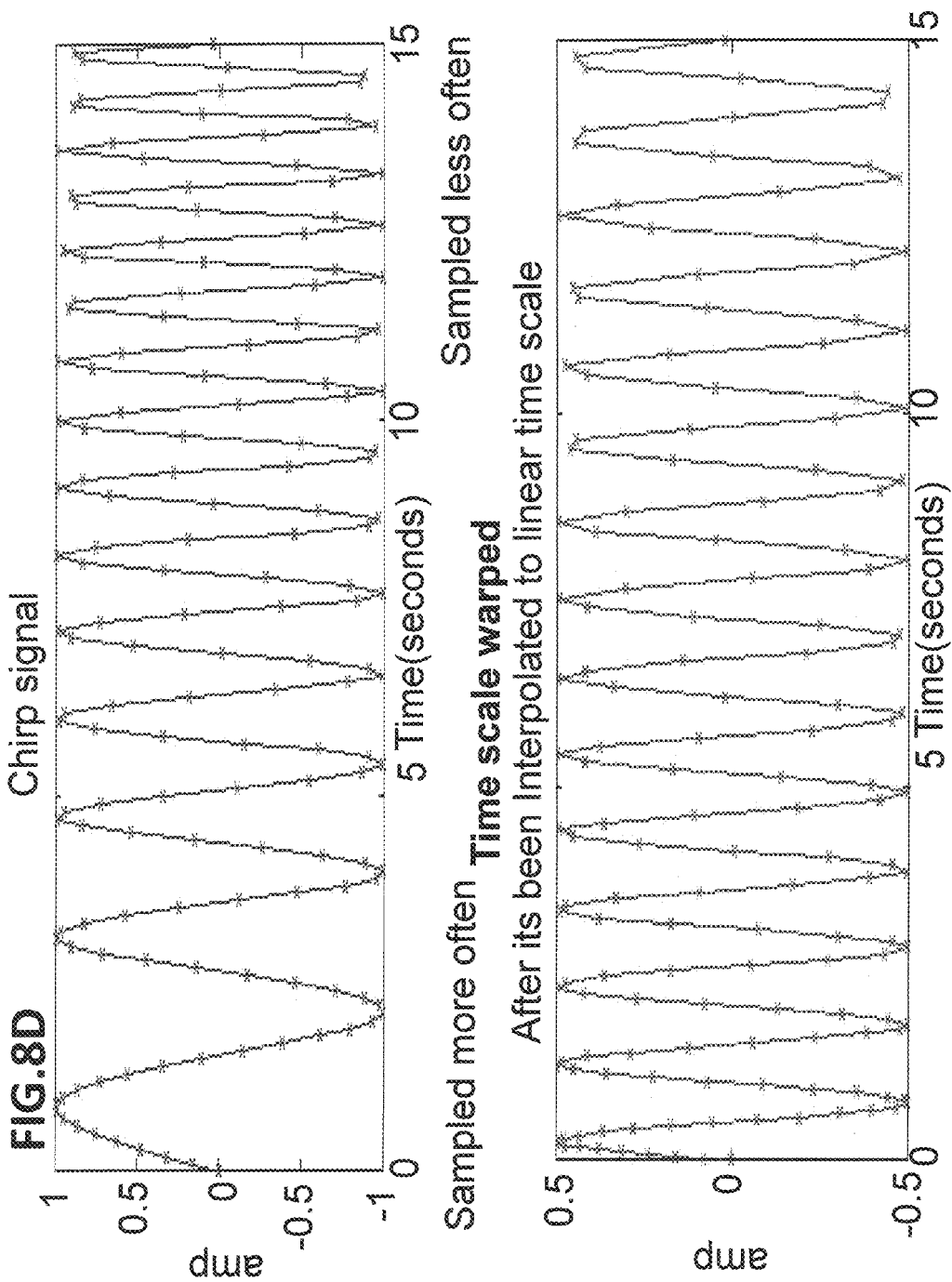

Autofocus algorithm

FIG. 9B $$q(t,p) = A_p e^{j(\omega_p t + \varphi_p + \theta_e(t))} \quad \text{for } 0<t<T$$

where $A_p$ is the amplitude of the $p^{th}$ scattering center, $\omega_p$ is the frequency, $\varphi_p$ is an arbitrary phase offset, and $\theta_e(t)$ is an unknown phase error $$q_w(t,p) = A_p e^{j(\varphi_p + \theta_e(t))} \otimes W(t)$$

where * represents convolution and $W(t)$ is a window function (see 15C).

$$\dot{\theta}_e(t) = \sum_p \frac{\text{Im}(\dot{q}_w(p,t)) q_w^*(p,t)}{|q_w(p,t)|^2} \quad \text{—15E}$$

FIG.9C

PGA algorithm for harmonic acoustic signals

15E — Radar
$$\dot{\theta}_e(t) = \sum_P \frac{\mathrm{Im}(\dot{q}_w(p,t)) q_w^*(p,t)}{|q_w(p,t)|^2}$$

15E — Acoustic
$$\dot{\theta}_e'(t) = \sum_L \frac{\mathrm{Im}(\dot{q}_w'(l,t)) q_w'^*(l,t)}{l|q_w'(l,t)|^2}$$

15E-ROTOR — Rotorcraft
$$h(t) = real\left(\sum_{l=1}^{L} A_l e^{jl\nu(t+\varphi(t))}\right) + f(t)$$

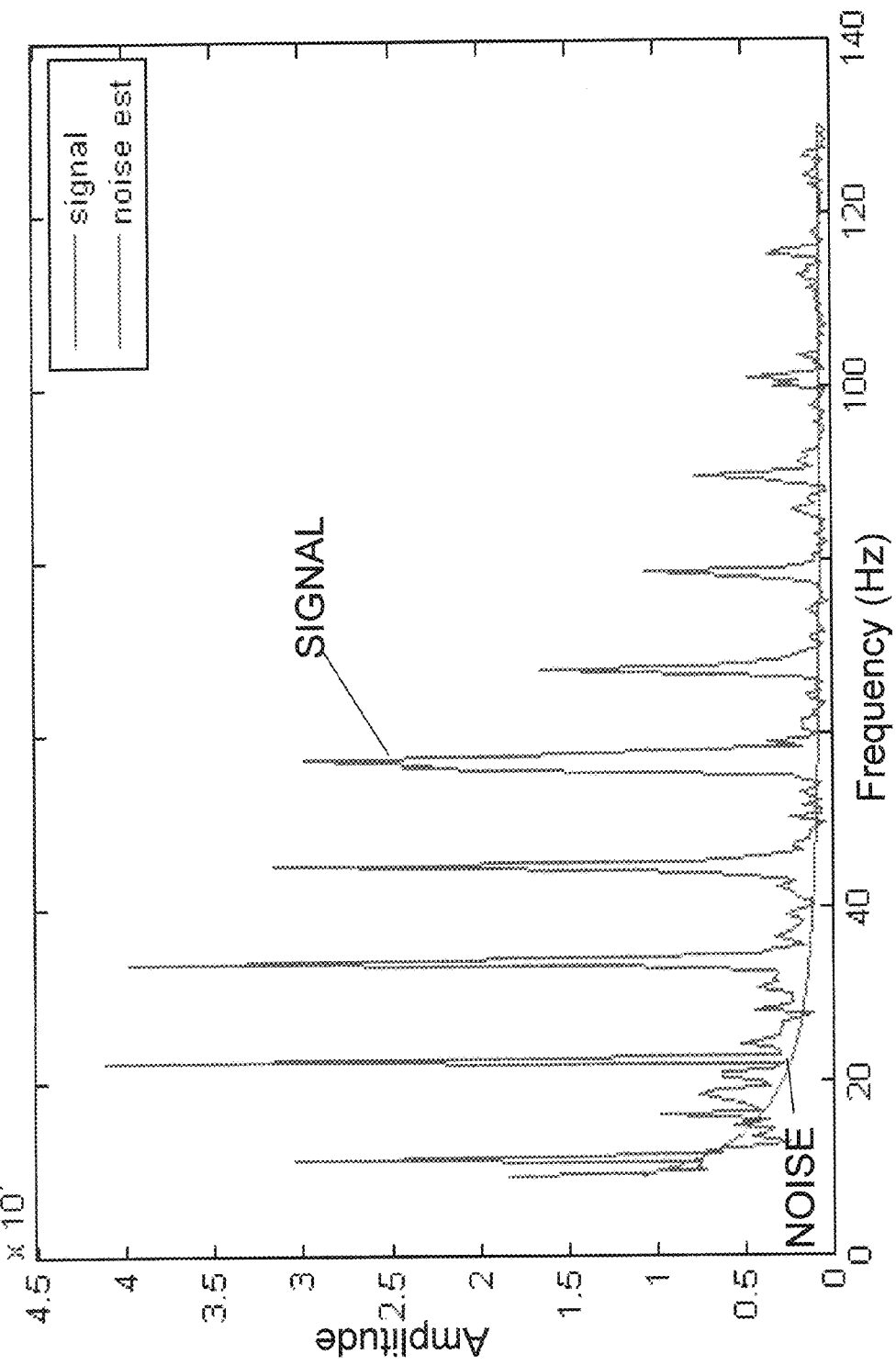

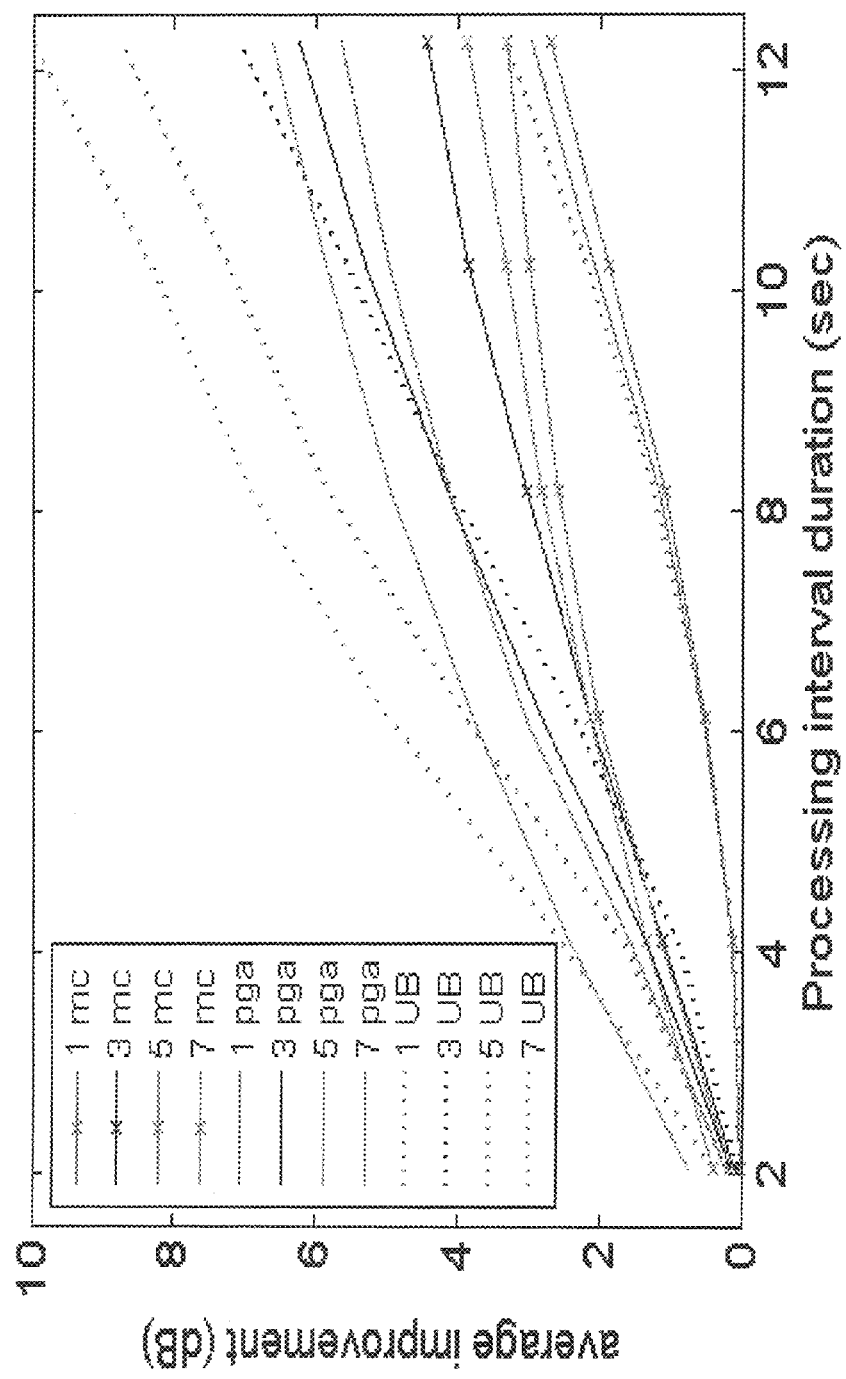

METHOD AND SYSTEM FOR MOTION COMPENSATED TARGET DETECTION USING ACOUSTICAL FOCUSING

STATEMENT OF GOVERNMENT INTEREST

The embodiments herein may be manufactured, used, and/or licensed by or for the United States Government without the payment of royalties thereon.

BACKGROUND OF THE INVENTION

There exists an interest in classifying, tracking, and canceling the signals from military assets using passive acoustic sensors. Goals for battlefield acoustics include localization, tracking, identification, motion compensation/Autofocus. preprocessor, focus spectrum (classification algorithms, nulling algorithms, and small improvement localization algorithms). As to autofocus, phase gradient autofocus (PGA) algorithm is the subject of P. H Eichel. and C. V. Jakowatz, "Phase gradient algorithm as an optimal estimator of the phase derivative," Optics Letters, Vol. 14, No. 20, 1101-1103, (1989) and P. H Eichel, D. C. Ghiglia, and C. V. Jakowatz, Jr., "Speckle processing method for synthetic aperture radar phase correction," Optics Letters, Vol. 14, 1101-1103, (1989), both of which are hereby incorporated by reference.

During the classifying, tracking, and/or canceling of signals from military assets using passive acoustic sensors, many targets have acoustic signatures with large peaks in their spectrum that can be exploited by signal processing algorithms. However, target motion and turbulence in the atmosphere can distort the transmitted signal and degrade the performance of these signal processing algorithms. Preprocessing the data using motion compensation and autofocus algorithms can focus the signature of the target, and thereby provide longer coherent processing interval durations and improved performance of previously developed algorithms.

SUMMARY OF THE INVENTION

The present invention is directed to an algorithm that, inter alia, focuses the frequency spectrum of moving targets such as, for example, a maneuvering rotorcraft. In a preferred embodiment, the acoustic spectrum data is motion compensated by tracking the time-varying Doppler shift generated by the main rotor blade, then a modified PGA algorithm is applied to the data.

A preferred methodology for improving the sensing of data associated with a target on a processor comprising: estimating the average instantaneous frequency; reducing or removing noise from the average instantaneous frequency; compensating for the motion of the target to obtain motion compensated data and focusing the motion compensated data; performing a discrete fourier transform on the focused motion compensated data. Optionally, the reducing or removing noise from the average instantaneous frequency comprises using one of a filter or smoother. Optionally, the focusing of the motion compensated data comprises utilizes a phase gradient autofocus algorithm applied to the acoustic signature of a maneuvering rotorcraft. Optionally, the focusing of the motion compensated data utilizes a modified phase gradient autofocus algorithm Optionally, the step of estimating the average instantaneous frequency comprises: (a) performing a fast fourier transform on the data; (b) applying a window function; (c) converting back to the time domain (d) applying a cross correlation function; (e) finding a location of a peak; and (f) calculating the fundamental frequency.

Optionally, the step of estimating the average instantaneous frequency comprises finding a peak location of a weighted autocorrelation; the weighting being based upon a Wiener filter. Optionally, the removing of noise from the average instantaneous frequency data comprises (a) initializing state space variables values and covariance in a matrix; b) obtaining frequency estimates; c) calculating innovation; d) updating state space variables and covariance in the matrix; e) repeating steps b) through d) until the estimation of state variables is completed.

A preferred embodiment methodology comprises estimating the average instantaneous frequency of the first harmonic of a moving target using at least one processor; inputting the average instantaneous frequency into an error reduction subroutine; using state space estimates of the frequency, calculating a time warping that will remove the effect of the time-varying Doppler shift from the data; focusing the data using a modified phase gradient autofocus algorithm. Optionally, the error reduction subroutine comprises a fixed lag smoother. Optionally, the system further comprises performing a discrete fourier transform on the focused data. Optionally, the reducing or removing of noise from the average instantaneous frequency comprises using one of a filter or smoother. Optionally, the focusing of the motion compensated data comprises utilizing a phase gradient autofocus algorithm applied to the acoustic signature of a maneuvering rotorcraft. Optionally, the focusing of the motion compensated data comprises using a modified phase gradient autofocus algorithm. Optionally, the estimating of the average instantaneous frequency comprises: performing a fast fourier transform on the data; applying a window function; applying a cross correlation function; finding a location of a peak; and calculating the fundamental frequency.

A preferred embodiment system for improving the sensing of data associated with a target comprising at least one processor, the at least one processor operating to perform the steps of: estimating the average instantaneous frequency; reducing or removing noise from the average instantaneous frequency; compensating for the motion of the target to obtain motion compensated data; focusing the motion compensated data; and performing a discrete Fourier transform on the focused motion compensated data.

BRIEF DESCRIPTION OF THE DRAWINGS

The embodiments herein will be better understood from the following detailed description with reference to the drawings, in which:

FIG. 3A is an illustration showing the spectrum of a rotorcraft calculated using 8.2 s of data.

FIG. 3B is an illustration showing zoomed in spectrum of a rotorcraft near the 5th harmonic calculated using 8.2 s of data.

FIG. 7B is an illustration of a fixed lag smoother with a lag of 1 sample.

FIG. 8A is an illustrative flow chart for an example of the motion compensation component of the preferred embodiment.

FIG. 8B is an illustrative showing the time scale warping of the data for a single processing interval.

FIG. 8C is an illustration showing time scale of data over multiple processing intervals.

FIG. 8d is an illustration of a conceptual example of motion compensation.

FIG. 9B is an illustration of equations used in a PGA algorithm for SAR image.

FIG. 9C is an illustration of variation of the PGA algorithm for signals.

FIG. 10 is an illustration of the spectrum of a rotorcraft and the spectrum of the estimated noise.

FIG. 11 is an illustration evaluating the results.

DETAILED DESCRIPTION OF PREFERRED EMBODIMENTS

Figure 1:
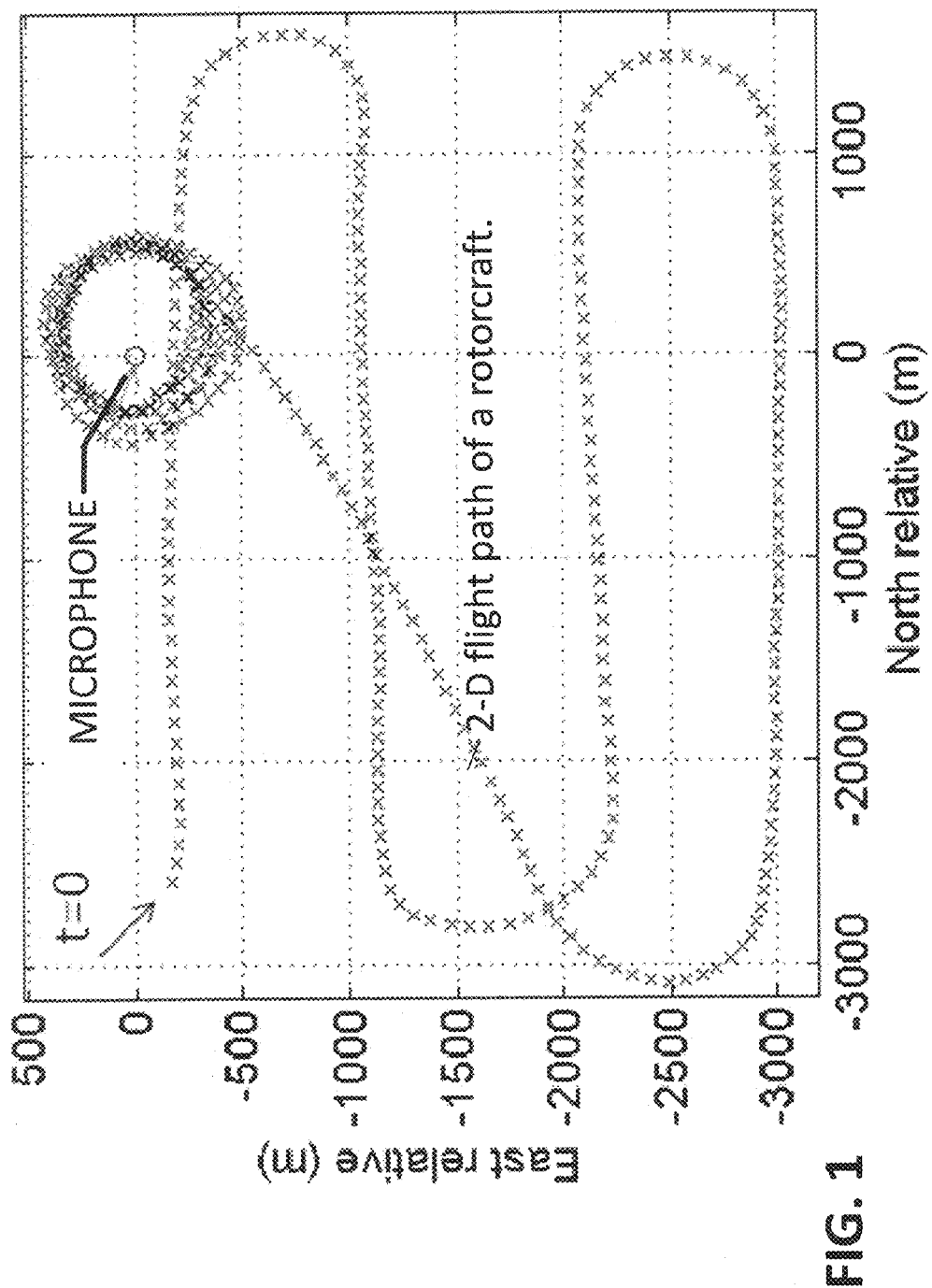
FIG. 1 is an illustration of a two-dimensional flight path for a rotorcraft.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skilled in the art to practice the embodiments of the invention. Accordingly, the examples should not be construed as limiting the scope of the embodiments of the invention.

The terminology used herein is for the purpose of describing particular embodiments only and is not intended to limit the full scope of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element such as an object, layer, region or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be understood that, although the terms first, second, etc. may be used herein to describe various elements, components, regions, layers and/or sections, these elements, components, regions, layers and/or sections should not be limited by these terms. Thus, a first element, component, region, layer or section discussed below could be termed a second element, component, region, layer or section without departing from the teachings of the present invention.

Furthermore, relative terms, such as "lower" or "bottom" and "upper" or "top," may be used herein to describe one element's relationship to other elements as illustrated in the Figures. It will be understood that relative terms are intended to encompass different orientations of the device in addition to the orientation depicted in the Figures. For example, if the device in the Figures is turned over, elements described as being on the "lower" side of other elements would then be oriented on "upper" sides of the other elements. The exemplary term "lower", can therefore, encompass both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below. Furthermore, the term "outer" may be used to refer to a surface and/or layer that is farthest away from a substrate.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will also be appreciated by those of skill in the art that references to a structure or feature that is disposed "adjacent" another feature may have portions that overlap or underlie the adjacent feature.

The target signature or signal may be modeled by $d(t)=h(\kappa(t))+n(t)$, where $d(t)$ is the measured acoustic signal of the target as a function of time, $h(t)$ is the signal emitted by the target, $\kappa(t)$ is a function that distorts the signal due to target motion, and $n(t)$ is noise. For rotorcraft:

$$h(t)=\text{real}(\Sigma_{l=1}^{L} A_l e^{jl\nu(t+\phi(l))})+f(t)$$

where $h(t)$ is the acoustic signal emitted from the rotorcraft at time t; $Al$ and $\phi l$ are the amplitude and phase for the $1^{st}$ harmonic; L is the number of harmonics; j is the square root of −1; v is the fundamental frequency; and f(t) is an unknown function.

During the classifying, tracking, and/or canceling of signals from military assets using passive acoustic sensors, many targets have acoustic signatures with large peaks in their spectrum that can be exploited by signal processing algorithms. However, target motion and turbulence in the atmosphere can distort the transmitted signal and degrade the performance of these algorithms. Preprocessing the data using motion compensation and autofocus algorithms can focus the signature of the target, and thereby provide longer coherent processing interval durations and improved performance of previously developed algorithms.

Coherent focusing algorithms are widely used in the field of radar signal processing. For example, when a synthetic aperture radar (SAR) image is generated the motion of the platform is typically accounted for by multiplying the received data by the complex conjugate of the phase of the signal returned by an isotropic point scatterer located in the center of the image scene. This requires knowledge of the velocity of the aircraft (platform for the SAR radar) and the transmitted waveform. For passive acoustic sensors, the velocity of the target and the waveform of the signal are typically unknown. However, for many targets of interest, information about the structure of the waveform is known. For example, the rotation rate of the blades on a rotorcraft or the propellers on an airplane is typically fixed, and it generates acoustic waveforms with multiple spectral peaks with stable frequencies. For these targets, time-varying Doppler shifts can be estimated and used to calculate a time warping that will remove these effects from the data.

A preferred embodiment algorithm of the present invention may be utilized to focus the acoustic spectrum of a maneuvering rotorcraft. First, the data may be motion compensated based upon the estimates of the fundamental frequency of the signal generated by the main rotor blade. State space estimates of the frequency may be to calculate a time warping that removes the effect of the time-varying Doppler shift from the data. Then, the motion compensated data may be further focused using a modified phase gradient autofocus (PGA) algorithm.

To this end, a preferred embodiment algorithm was evaluated by analyzing the increase in the amplitude of the harmonics in the spectrum of a rotorcraft. The results depended upon the frequency of the harmonics, processing interval duration, target dynamics, and atmospheric conditions. Under good conditions, the results for the fundamental frequency of the target (~11 Hz) almost achieved the predicted upper bound. The results for higher frequency harmonics had larger increases in the amplitude of the peaks, but smaller improvements than the predicted upper bounds. The preferred embodiment algorithm can be used to preprocess data for classification, tracking, and nulling algorithms.

Once the SAR image is generated, it is typically further processed using an autofocus algorithm. Most autofocus algorithms assume there are isotropic scattering centers in the scene that are blurred by errors not corrected for in the motion compensation algorithm. A standard technique to focus SAR images is the phase gradient autofocus (PGA) algorithm. For an acoustic signal generated by a rotorcraft, there are multiple harmonics that are distorted by the motion of the target and atmospheric effects. The same techniques used in radar to focus a point scatterer in a scene can be applied to atmospheric acoustics to focus the spectrum of target with some modifications.

Focusing algorithms have been developed for many acoustic applications. For example, techniques have been developed that reduce the error in time-of-arrival estimates for moving targets by accounting for the effect of the Doppler shift in the signal processing. As used herein, the terminology "Doppler" shift" is the change in frequency of a wave occurring when the observer is moving relative to the source of the origin of the wave or when the source is moving relative to the observer. Moreover, "Doppler Shift" includes Bistatic Doppler shift which occurs when the receiver and transmitter of a radar or sonar system are separated. According to Wikipedia, the Doppler shift is due to the component of motion of the object in the direction of the transmitter, plus the component of motion of the object in the direction of the receiver. Equivalently, it can be considered as proportional to the rate of change of bistatic range.

In a bistatic radar with wavelength $\lambda$, where the distance between transmitter and target is Rtx and distance between receiver and target is Rrx, the received bistatic Doppler frequency shift is calculated as:

$$f = \frac{1}{\lambda}\frac{d}{dt}(R_{tx} + R_{rx})$$

Algorithms have also been developed that take advantage of the Doppler shift to track the speed and height of fixed-wing aircraft. Another area where removing the effect of Doppler shifts is important is in underwater communication. For example, B. S. Sharif, "A Computationally Efficient Doppler Compensation. System for Underwater Acoustic Communications," IEEE J. Oceanic Eng., 25 (1), (2000) uses a bank of matched filters to estimate and reduce the effect of Doppler shifts on communication waveforms caused by changing environmental conditions. The present invention is directed to developing an algorithm to preprocess data for several applications. It should improve the performance of classification algorithms by focusing the signature of the target and improving the results of nulling algorithms by allowing narrowband techniques to be applied to peaks in the spectrum of the target.

A major issue associated with most motion compensation algorithms is the tradeoff between accuracy and computational efficiency. The maximum likelihood estimate (MLE), which is an asymptotically efficient estimator, can usually be computed to compensate for the effect of target motion. However, it is usually computationally expensive to implement. Most of the papers in the literature have focused on developing suboptimal techniques that are computationally efficient, which is also a goal of the present invention.

The algorithm developed in accordance with the principles of the present invention processes data in three stages. First, the average instantaneous frequency of the first harmonic of a rotorcraft is estimated and input to a fixed-lag smoother. Then, the state space estimates of the frequency are used to calculate a time warping that will remove the effect of the Doppler shift from the data. Lastly, the data is further focused using a modified phase gradient autofocus (PGA) algorithm.

The algorithm developed in accordance with the principles of the present invention was tested using acoustic data from a rotorcraft measured with a single microphone. It was evaluated using metrics based upon the increase in the peak levels of the harmonics in the spectrum. Both the percentage of peaks that increased in amplitude after motion compensation and the amount of their improvement were analyzed. These results were compared to theoretical predictions based on coherent processing gain and estimates of the instantaneous frequency of the target.

For ease of reading, the general organization of this disclosure may be summarized as introducing the problem, describing a target model for the acoustic signature of the target, describing the resampling algorithm, describing the phase gradient autofocus (PGA) algorithm and the data collection. Then, the fixed-lag smoothing algorithm that is used to estimate the frequency of the target is next explained and the data processing is described and the results are analyzed, and then summarized.

An example of a phase gradient autofocus (PGA) algorithm is further described in P. H Eichel. and C. V. Jakowatz, "Phase gradient algorithm as an optimal estimator of the phase derivative," Optics Letters, Vol. 14, No. 20, 1101-1103, (1989), which is hereby incorporated by reference.

A simple model that describes the acoustic signal measured on the ground with a microphone for a moving target is $$d(t) = h(\kappa(t)) + n(t), \quad (1)$$

where d(t) is the measured acoustic signal of the target as a function of time, h(t) is the signal emitted by the target, $\kappa(t)$ is a function that distorts the signal due to target motion, and n(t) is noise. For a target such as a rotorcraft, the model can be expanded into the signal generated by a dominant harmonic source, such as the main rotor blades and everything else. The signal from the main rotor blades can be modeled as a harmonic signal with a constant fundamental frequency, with amplitude weights on each harmonic. The signal model for the target can be described by $$h(t) = \sum_{l=1}^{L} A_l e^{j(vlt + \phi_l)} + f(t), \text{ for } 0 < t < T \quad (2)$$

where h(t) is the acoustic signal emitted from the rotorcraft at time t; $A_l$ and $\phi_l$ are the amplitude and phase for the harmonic, respectively; L is the number of harmonics; j is the square root of −1; v is the fundamental frequency; and f(t) is an unknown function, and T is the processing time interval.

The model assumes that the signal propagates under ideal atmospheric conditions and spherical propagation losses are incorporated into the coefficients.

The effect of target motion on the measured signal can be modeled using $d(t) = h(t − \tau)\tau(t))$, where $\tau(t)$ is the propagation delay from the target to the measurement location at a given time. Its effect can be approximated by performing a Taylor series expansion on $\tau(t)$ with respect to time. The coefficients of the parameters in the expansion are not known without knowledge of the target dynamics, but they can be described using a polynomial equation. The propagation delay can be described using $$\tau(t) = b_0 + b_1 t + b_1 t^2 + b_3 t^3 + \Phi_e(t) \text{ for } 0 < t < T, \quad (3)$$

where $b_0$-$b_3$ are constants, and $\Phi_e(t)$ represents a small error term. For a signal with a stable spectral peaks, such as a waveform with harmonic structure, the instantaneous frequency can be computed by substituting (3) into the first term in (2), setting l=1, then taking the derivative of the phase. The result is a second-order polynomial $$\omega(t) = \omega_0 + Bt + Ct^2 + D\dot{\phi}_e(t) \text{ for } 0 < t < T, \quad (4)$$

where $\omega_0$ is the fundamental frequency of the target plus a Doppler shift, and B and C are constants associated with the time varying Doppler shift and D is a constant associated the derivative of the error term. Although a constant Doppler shift cannot be estimated by tracking the fundamental frequency of the target without prior knowledge, B and C can be estimated from the spectrum of the data and used to motion compensate the data. In addition, the error term can be estimated from the blurring in the spectrum using autofocus techniques.

Motion Compensation Algorithm

Conceptually, the effect of the Doppler shift can be removed by resampling the data using $$h(t) = d(m(t)), \quad (5)$$

where $m(t) = \kappa(t)^{-1}$ and −1 denotes the inverse. Rather than calculating the inverse of $\kappa(t)$, an alternative procedure is to warp the time scale of the data so that the function that distorts the signal is removed when the data are resampled to a time scale with uniform increments.

According to Wikipedia, Dynamic time warping (DTW) is an algorithm for measuring similarity between two sequences which may vary in time or speed.

If the signal is significantly oversampled in time relative to the Nyquist rate, then signal can be resampled using interpolation algorithms with minimal errors in reconstructing the original signal. For a further discussion, see B. S. Sharif, "A Computationally Efficient Doppler Compensation. System for Underwater Acoustic Communications," IEEE J. Oceanic Eng., 25 (1), (2000) (hereby incorporated by reference). This procedure can be applied to any higher-order polynomial function describing the distortion. The time scale associated with the discretely sampled data that are modeled using the second-order polynomial shown in (4) can be warped using $$\gamma(n) = \frac{n\Delta t \left(1 + \frac{Bn\Delta t}{\omega_0} + \frac{C}{\omega_0}(n\Delta t)^2\right)}{\left(1 + \frac{B}{\omega_0}((N-1)\Delta t) + \frac{C}{\omega_0}((N-1)\Delta t)^2\right)} \text{ for } n = 0, \ldots, N-1, \quad (6)$$

where N is number of samples in a processing interval and $1/\Delta t$ is the sample rate for the analog-to-digital converter (ADC). Now, the data with the new warped time scales can be resampled by interpolating to positions on the linear time array given by [0, $\Delta t$, ..., (N−1)$\Delta t$]. The term in the denominator of (6) is required so that the interpolation is performed over the full range of the linear time array. This procedure removes the distortion from higher-order terms in the spectrum of the data. The fundamental frequency associated with the motion-compensated data is translated to approximately the average instantaneous frequency of the original signal.

To motion compensate the data over longer time periods, several consecutive estimates of the time-warping function shown in (6) can be combined. The index associated with each warping function is determined by finding the smallest integer $i = \lceil t/T \rceil$ that is not less than t/T where T is the processing interval time. For post-processing algorithms that require a coherent signal, the time-warping functions need to be generated relative to a common reference frequency and have a consistent time offset between consecutive processing intervals. The reference frequency for data starting at the $i^{th}$ processing interval is denoted by $\omega_{0,i}$. The time offset between processing intervals can be represented as a phase offset multiplied by the reference frequency. The starting phase offset at the $i^{th}+1$ processing interval can be determined by evaluating (3) at $T = N\Delta t$. The resulting phase offset for the $i^{th}+1$ processing interval (where $\Psi_{i+1}$ is the accumulated phase) is $$\Psi_{i+1} = \omega_{0,i} T + B_i T^2 + C_i T^3. \quad (7)$$

where $B_i$ and $C_i$ are constants associated with the $i^{th}$ processing interval. Now, the algorithm can process data collected over a longer time period by concatenating together the results from several shorter processing interval times. The time scale of the data can be warped using $$G_{i,M,N}(\cdot) = (g_{i,i,N}(\cdot)|g_{i,i+1,N}(\cdot)|\ldots|g_{i,i+I-1,N}(\cdot)), \quad (8)$$

where $$g_{i,j,N}(n) = \left(n\Delta t\left(\frac{\omega_{0,j}}{\omega_{0,i}} + \frac{B_j}{\omega_{0,i}}n\Delta t + \frac{C_j}{\omega_{0,i}}(n\Delta t)^2\right) + \frac{\Gamma_{i,j}}{\omega_{0,i}}\right)/K_2 \quad (9)$$

for $n = 0, \ldots, N-1$, $$\Gamma_{i,j} = \sum_{k=i}^{k=j-1} \Psi_k,$$

where $\Gamma_{i,j}$ is the accumulated phase offset starting at the $i^{th}$ cpi and ending at the $j^{th}$ cpi.

$$K_2 = \frac{\left(\frac{\Gamma_{i,M}}{\omega_{0,i}} + (N-1)\Delta t\left(\frac{\omega_{0,i+M-1}}{\omega_{0,i}} + \frac{B_{i+M-1}}{\omega_{0,i}}(N-1)\Delta t + \frac{C_{i+M-1}}{\omega_{0,i}}((N-1)\Delta t)^2\right)\right)}{(MN-1)\Delta t},$$

where i is the starting processing interval of interest, M is the number of processing intervals combined, N is the number of samples in the shorter processing interval, represents concatenation, and the dimensions of $G_{i,M,N}$ are MN×1. Now, the data can be motion compensated by interpolating it with the warped time scale to the positions on the linear time array given by $[0, \Delta t, \ldots, (MN-1)\Delta t]$.

Autofocus Algorithm

The phase gradient autofocus (PGA) algorithm was modified to further focus the spectrum of the target. The PGA algorithm assumes that the processed signal from a single scattering center in a range bin in a stripmap SAR image can be described by $$q(t,p) = A_p e^{j(\omega_p t + \phi_p + \theta_e(t))} \text{ for } 0 < t < T \quad (10)$$

where $A_p$ is the amplitude of the $p^{th}$ scattering center, $\omega_p$ is the frequency, $\phi_p$ is an arbitrary phase offset, and $\theta_e(t)$ is an unknown phase error[12][a]. This signal is demodulated to baseband and isolated using a window function to obtain $$q_w(t,p) = A_p e^{j(\phi_p + \theta_e(t))} \otimes W(t) \quad (11)$$

where $\otimes$ represents convolution and $W(t)$ is a window function. The derivative of the phase error for this signal can be estimated using $$\dot{\theta}_e(t) = \sum_P \frac{\text{Im}(\dot{q}_w(p,t)q_w^*(p,t))}{|q_w(p,t)|^2} \quad (12)$$

For improved performance, the procedure can be applied iteratively to the image. The model for the acoustic signal generated by the main rotor blades after motion compensation is $$q'(t,l) = A_l e^{j(vlt + w_d lt + \phi_l + l\theta'_e(t))} \quad (13)$$

where $$\theta'_e(t) = \theta_e(\kappa^{-1}(t)),$$

$\omega_d$ is caused by an unknown Doppler shift and interpolation effects. The error term is warped by the motion compensation algorithm, but its effect on the autofocus algorithm is not important since its modifying an unknown error. This signal is demodulated to baseband for each harmonic then transformed into the Fourier domain and the phase error is isolated using a window function.

$$q'_w(t,l) = A_l e^{j(\phi l + l\theta'_e(t))} \otimes W_l(t) \quad (14)$$

The window function selected for different harmonics is a rectangular window for frequencies between $\pm F_1$ where $$F_1 = F_0(1 + \log(l/L)) \quad (15)$$

and $F_0$ is the frequency span for the fundamental frequency. Ideally, the window function would increase linearly with frequency for harmonics with equal signal-to-clutter ratios, however, this can result in more than one harmonic being contained in a single window. To prevent this, a logarithmic window was selected.

If the phase errors obtained in Equation (15) are divided by the harmonic number, then the standard phase gradient autofocus (PGA) algorithm can applied to the acoustic data as shown below:

$$\dot{\theta}'_e(t) = \sum_L \frac{\text{Im}(\dot{q}'_w(l,t)q_w'^*(l,t))}{l|q'_w(l,t)|^2} \quad (16)$$

Estimates of the phase errors can be obtained by integrating its derivative. Corrections to the signal can be performed using the same techniques used by the motion compensation algorithm. The time scale of the signal is warped to $$\gamma'(n) = \frac{n\Delta t + \theta'_e(n)/\omega_{0,1}}{1 + \theta'_e(NM-1)/(\omega_{0,1}(NM-1))} \quad (17)$$

for $n = 0, \ldots, MN-1$, then interpolated to the positions on the linear time array given by $[0, \Delta t, \ldots, (MN-1)\Delta t]$.

Rotorcraft Data Measurements

The algorithm was tested using acoustic data that were collected as a rotorcraft flew around a microphone that was 1 m above the ground in the grid and in circular patterns, as shown in FIG. 1, which is an illustration of a 2-D flight path of a rotorcraft. The approximate height of the rotorcraft during the grid pattern part of the flight was 800 m, and the height during the circular pattern started at approximately 900 m and ended at 250 m after approximately five loops. The data were collected in the afternoon and the outside temperature was approximately 33° C. The position of the rotorcraft was recorded and time-stamped using a global positioning system (GPS)/inertial navigation system (INS) receiver at a rate of 1 Hz. The acoustic data were sampled at rate of 1.0016 KHz with a 24-bit ADC. The fundamental frequency associated with the main rotor blades was approximately 11 Hz.

Frequency Tracking Algorithm

Tracking the harmonics of a rotorcraft can be a challenging problem. At low frequencies, noise from the wind can be large, and at high frequencies, attenuation from the atmosphere can be large. See in this regard, F Skode, "Windscreening of Outdoor Microphones," Bruel and Kjaer Tech. Rev. 1, (1966). Also, there are multiple harmonic and non-harmonic signals present in the signature of rotorcrafts, which are related to the fundamental frequency generated by the main rotor blades. These factors affect the tracking algorithm results.

The fundamental frequency of the rotorcraft can be estimated using techniques based upon autocorrelation. For targets that have a harmonic structure and a constant Doppler shift, the location of the peak in the autocorrelation result is inversely proportional to the fundamental frequency of the target. For further discussion, see D. Gerhard, "Pitch Extraction and Fundamental Frequency: History and Current Techniques," in Technical report TR-CS 2003-06, (Dept. of Computer Science, University of Regina), (2003), hereby incorporated by reference. Variations in the frequency as a function of time will cause the location of the peak in the autocorrelation result to translate and smear. Its location can be determined by performing a Fourier transform on $$|F(e^{j(\omega_0 t + Bt^2 + Ct^3)})| \text{ for } 0 < t < T, \quad (18)$$

where F denotes the Fourier transform and |•| denotes absolute value, and then finding the frequency associated with its maximum amplitude. The frequency estimated from a Fourier transform of the data is inversely proportional to period estimated using autocorrelation. For $BT^2 \ll 1$ and $CT^3 \ll 1$, the location of the peak in the discrete Fourier transform (DFT) is proportional to the average instantaneous frequency given by $\omega_i + BT + T^2$.[22] This result is used by the frequency tracking algorithm.

The frequency of the target was tracked using a third-order, fixed-lag smoother with a lag of one sample and a white-noise jerk model. A further information in this regard may be found in A B. D. O Anderson and J. B. Moore, Optimal Filtering, (Prentice-Hall, Englewood Cliffs, N.J., 1979), Chap 7 and R. Li and V. P. Jilkov, "Survey of maneuvering target tracking. Part I: Dynamic Models" IEEE Trans on AES, 39, 1333-1364, (2003), both of which are hereby incorporated by reference. The continuous-time model characterizing the fundamental frequency is given by $$\dot{\vec{x}}(t) = A\vec{x}(t) + B\vec{u}(t), \quad (19)$$

where $$A = \begin{bmatrix} 0 & 1 & 0 \\ 0 & 0 & 1 \\ 0 & 0 & 0 \end{bmatrix},$$

$$B = \begin{bmatrix} 0 \\ 0 \\ 1 \end{bmatrix},$$

$$\vec{x} = \begin{bmatrix} x_1 \\ x_2 \\ x_3 \end{bmatrix},$$

$\vec{x}(\bullet)$ is the state vector, and $\vec{u}(\bullet)$ is the input vector whose elements are white noise. The relationship between the elements in the state vector and constants in (4) is $\omega_0 = x_1$, $B = x_2/2$, and $C = x_3/6$. The continuous-time model can be converted to a discrete-time model using a technique developed by Van Loan. This step is required to implement the fixed-lag smoother.

Measurements of the average instantaneous frequency of the target are described by $$y(nT) = H\vec{x}(nT) + \text{noise}, \quad (20)$$

where $H=[1 \ T/2 \ T^2/6]$, T is the processing interval time, and the noise is assumed to be independent and Gaussian-distributed.

The average instantaneous frequency of the target is estimated using a weighted autocorrelation of the data. First, a fast Fourier transform (FFT) is performed on data collected over a processing interval time of approximately 2.05 s. Then, the spectrum is truncated between 9 and 120 Hz and a weighting based upon a non-causal Wiener filter is applied. For a discrete signal, the weights can be approximated using $$Y_i'(k) = \frac{|S_i(k)|^2}{|S_i(k)|^2 + |N(k)|^2} \approx \frac{|Y_i(k)|^2 - |N(k)|^2}{|Y_i(k)|^2} \quad (21)$$

for $|Y_i(k)|^2 > |N(k)|^2$, $k = 0, 1 \ldots N - 1$;

otherwise $Y_i'(k) = 0$, where $S_i(k)$ is the DFT of the target signal measured during the $i^{th}$ processing interval for the $k^{th}$ frequency bin with no noise, N(k) is DFT of the noise that is estimated using statistics from previous data, and $Y_i(k)$ is the DFT of the signal measured during the $i^{th}$ processing interval. Next, the data are converted to the time domain and an autocorrelation is performed. The location of the peak is estimated by fitting the output of the autocorrelation function to a parabola and then setting the derivative of the equation to zero. This estimates the period of the signal, which is inversely proportional to its frequency. The measured frequency can be predicted using $y(nT) = H\vec{x}(nT)$.

An outlier rejection capability was added to the frequency tracking algorithm. If the measured frequency was larger than four standard deviations away from the value predicted by the target model, then the location of the largest peak in the spectrum was used to estimate the frequency. This measurement was divided by all possible harmonic numbers, and then the value that was consistent with the predicted frequency was selected. If no values were consistent, then the state variables were updated based upon model predictions without any input from the measurement data. If the frequency of the largest peak were stable, then it could be used directly as input to the tracking algorithm.

An analysis of the motion-compensation algorithm was performed by comparing the peak levels in the measured and simulated spectrums of the rotorcraft processed with and without motion-compensated data for several processing interval durations. The algorithm was implemented using estimates from the frequency tracking algorithm to warp the time scale using (8), then the data were resampled using spline-based interpolation. Linear interpolation was also tested, but the performance was lower and results were not reported. Since the sample rate of 1002 Hz is much larger than the average value of the highest frequency of interest, 77 Hz (7×11), interpolation should have a minimal impact on signal reconstruction errors. Again, in this regard, see. S. Sharif, "A Computationally Efficient Doppler Compensation. System for Underwater Acoustic Communications," IEEE J. Oceanic Eng., 25 (1), (2000). Next, the spectra of the data were computed and the peaks of the harmonics were estimated. First, the average instantaneous fundamental frequency for both the motion-compensated and uncompensated data were initially estimated using the same frequency tracking algorithm described in section 5. These two estimates needed to be consistent to within ±0.5% to be included in the analysis.

Greater than 99% of the results were consistent. At higher frequencies, the spacing between harmonics slightly deviated from a constant. To compensate for this effect, the peak values of the harmonics were determined by searching within ±1% of the values centered on estimates calculated using the average instantaneous fundamental frequency. To reduce the effect of scalloping errors, the spectrums were computed using an FFT with data arrays that were padded by a factor of six.

Results—Frequency Tracking Results

The first step in the processing is to estimate the state variables associated with the fundamental frequency of the main rotor blades. They were calculated using the frequency tracking algorithm described in section 5.0, using approximately 913 s of data. These results were compared to estimates calculated using the GPS position and velocity data collected on the rotorcraft. For a target with constant velocity, the Doppler frequency shift is $$f_d = \frac{|\vec{v}|\cos(\theta)}{\lambda}, \quad (22)$$

where $$\cos(\theta) = \frac{\vec{r}\cdot\vec{v}}{|\vec{r}||\vec{v}|},$$

$\vec{v}$ is the velocity vector for the rotorcraft, $\lambda$ is the wavelength of the fundamental frequency, $\vec{r}$ is the vector from the microphone to the rotorcraft, and denotes dot product. The GPS frequency was also estimated using a model that included the acceleration of the target, but the results were poor due to noise on the GPS data, and hence, are not shown.

Figure 2:
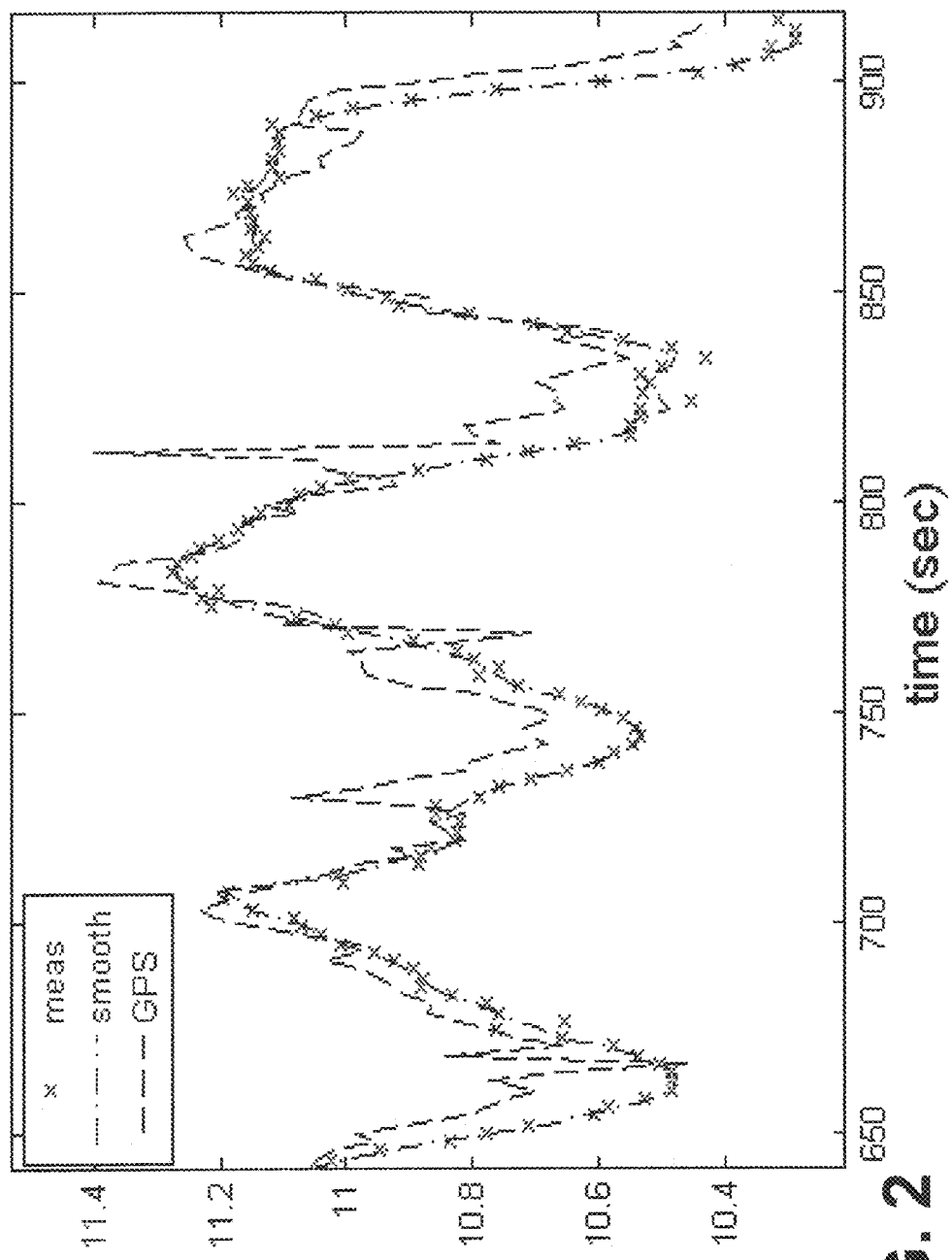
FIG. 2 is an illustration of estimates of the average instantaneous frequency of a rotorcraft. The smoothed estimates of the average instantaneous frequency shown in FIG. 2 usually tracked the Doppler frequency estimates obtained using the GPS data; however, there are some visual discrepancies.

A portion of the frequency tracking results are shown in FIG. 2, where the text "meas" in the legend corresponds to the line associated with the measured frequency input to the smoother, "smooth" corresponds to the frequency estimated from the fixed-lag smoother then processed using the model described equation (19), and "GPS" corresponds to the Doppler frequency estimated using equation (22). The GPS results have been compensated for acoustic propagation delay. In FIG. 2 the fundamental frequency of the helicopter was estimated, filtered, then smoothed at 2-second intervals. The results are shown where 'x' denotes the measured fundamental frequency, and 'smooth' denotes the fundamental frequency estimated using an RTS smoother.

The smoothed estimates of the average instantaneous frequency shown in FIG. 2 usually tracked the Doppler frequency estimates obtained using the GPS data; however, there are some visual discrepancies. The discontinuities suggest that the GPS estimated frequency is often less accurate than the frequency estimated using the acoustic data. This is probably caused by the GPS receiver losing and reestablishing satellite lock during the flight. The acoustic frequency measurements also had visual outliers near the peaks and troughs of the graph in FIG. 2, but with smaller deviations than the GPS estimates.

A simple statistical analysis was performed on the smoothed frequency tracking results. The minimum, average, and maximum of the estimated average instantaneous frequency are 9.6, 10.9 and 12.5 Hz, respectively, and the root mean square value of its derivative is 0.039 s$^{-2}$.

Results—Focusing Algorithm

The focusing algorithm was tested on the data collected for a rotorcraft flying the path shown in FIG. 1. The algorithm was run on six processing interval durations ranging from 2.05-12.3 s in 2.05-s increments. The data corresponding to each processing interval duration were selected by moving the time intervals forward 2.05 s, or equivalently, 2048-point increments. For data processed using a 2.05-s processing interval duration, a total of 448 spectrums were computed and there is no data overlap. For data processed using k times larger processing interval durations, k fewer spectrums were computed and there is data overlap.

The phase gradient autofocus (PGA) algorithm was implemented using two sets of parameters. First, it was run using data from harmonics 3, 4, 6, and 7 with a frequency span for the PGA window, $F_0$, of 10 percent of the estimated fundamental frequency. The 1st harmonic was not used since wind noise and other engine noise were larger and the 5th harmonic was not used since it was difficult to isolate from the harmonic from the tail rotor.

The phase gradient autofocus (PGA) algorithm was also implemented using data from only the $3^{rd}$ harmonic with a window size based upon 20 percent of the estimated fundamental frequency. The $3^{rd}$ harmonic was selected because it had a good SNR and it was near the middle of the frequencies being evaluated. The results for the other harmonics should not be biased by noise and interference near the $3^{rd}$ harmonic being potentially transformed into signal.

Several methods were used to evaluate the algorithms. First, an example of the results for a single spectrum is analyzed. FIG. 3A shows spectra of the rotorcraft calculated without motion compensation, with motion compensation, and with motion compensation and autofocus using 5 harmonic for approximately 8.2 s of data. They are denoted in the legend as "raw", "mc", and :pga", respectively. The data were motion compensated using the frequency tracking results for four consecutive processing interval times of 2.05 s. The spectrum calculated using the motion-compensated data is more focused and has higher peaks than the uncompensated spectrum and the spectrum calculated with the PGA compensated data is more focused than the spectrums calculated using the motion compensated data. Several harmonics from the main rotor blade are labeled by their number in FIG. 3A. Data near the $5^{th}$ harmonic and a harmonic from tail rotor blade are displayed in greater detail in FIG. 3B. The peaks at frequencies of approximately 53 and 54 Hz are resolvable in the motion-compensated and PGA focused spectrums, but are blurred in the "raw" data.

Figure 4A:
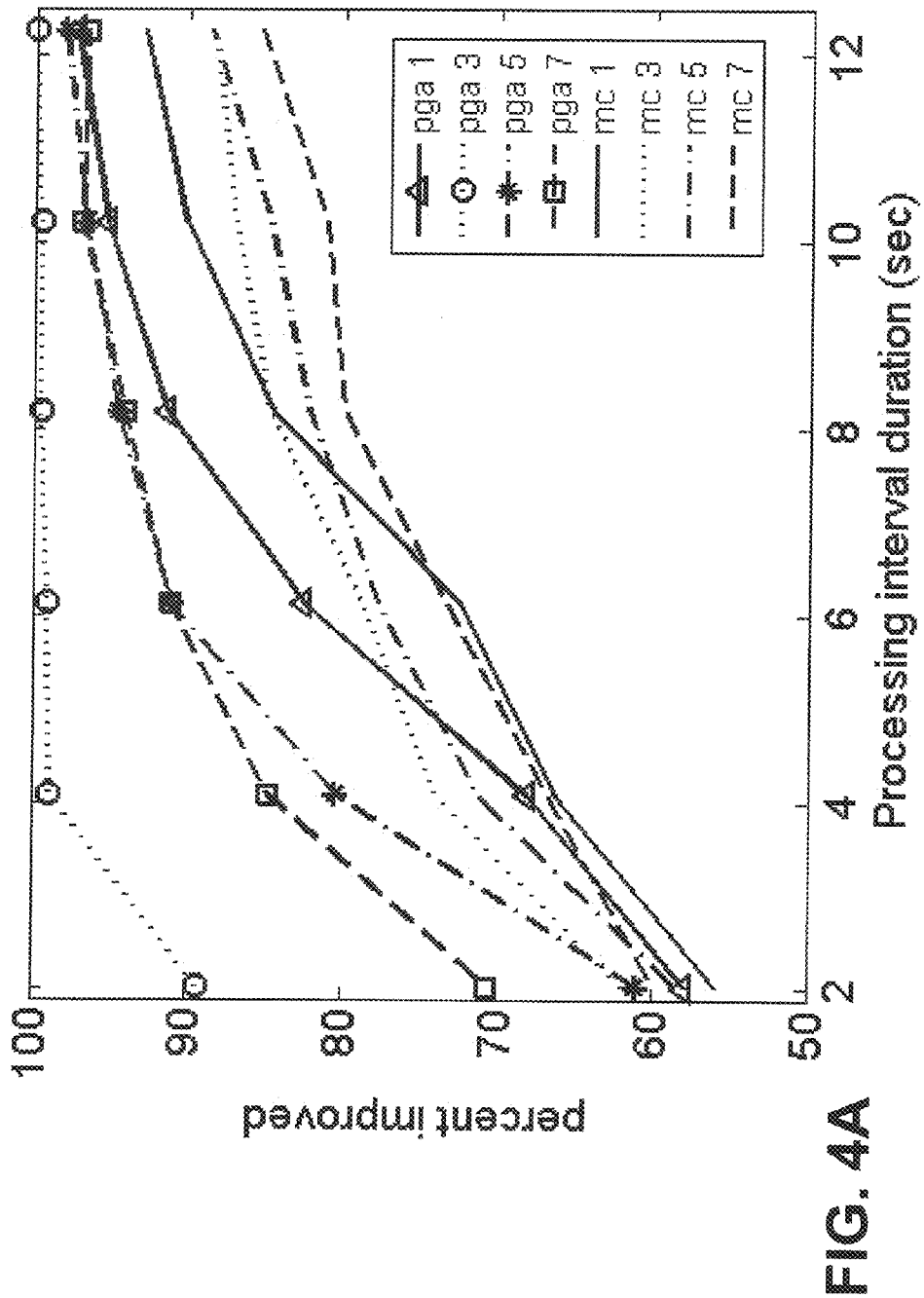
FIG. 4A. Percentage of the spectra in which the peak levels increased for four harmonics. PGA algorithm is based upon data associated with harmonics 2, 3, 4, 6, and 7.
Figure 4B:
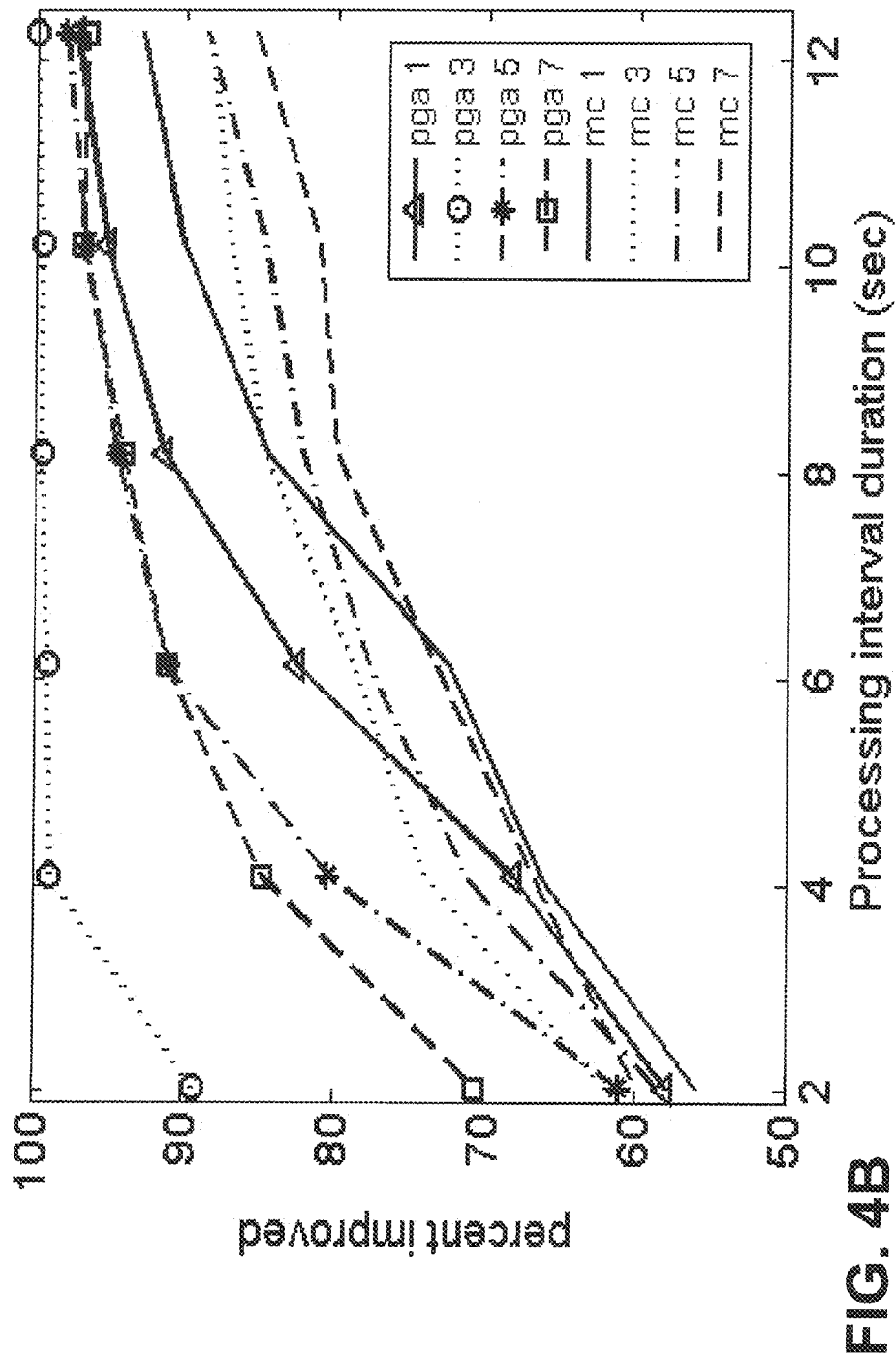
FIG. 4B Percentage of the spectra in which the peak levels increased for four harmonics. PGA algorithm is based upon data associated with only the $3^{rd}$ harmonic.

A quantitative analysis of the motion-compensation algorithm was performed using measured data and compared to upper bounds generated using simulated data and predictions based upon coherent processing gain. First, the spectra of the measured data were processed without motion compensation, with motion compensated data, and with PGA compensated data and their amplitudes were compared for each processing interval duration and harmonic number. FIGS. 4A and 4B show the percent of the peaks in the spectra calculated using measured data processed with the motion compensation algorithm and phase gradient autofocus (PGA) algorithm that were higher in amplitude than the peaks in the spectra processed using data processed without motion compensation for different processing interval durations and harmonic numbers. In FIG. 4A, the phase gradient autofocus (PGA) algorithm is based upon harmonics 2, 3, 4, 5, and 7, the $F_0$ in (14) is 10 percent of the estimated fundamental frequency. To improve the readability of the plots, only the results for harmonic numbers 1, 3, 5, and 7 are shown. The results for the other harmonics were similar.

As expected, the results improved as the processing interval duration was increased. For a 2.05-s processing interval duration, the percent improvement for the motion-compensated data was only slightly greater than 50%. As the processing interval duration was increased from 2.05 to 12.3 s, the percent improvement increased. For the fundamental frequency, the results increased from 55% to 93%. For processing intervals greater than or equal to 4.1 s, the results for both phase gradient autofocus (PGA) algorithms always improved results. As expected, the results for the PGA algorithm based only on the $3^{rd}$ harmonic were best for the third harmonic. The results for the other harmonics in FIG. 4B also improved, which is validation that the model to describe the signal is reasonable. Overall, the difference between the percent improvement of the two realizations of the PGA algorithms is small.

These results indicate that for shorter duration processing intervals, the algorithm did not significantly affect the peaks in the spectra of the rotorcraft. Unfortunately, even for some higher frequencies and longer processing interval durations, the algorithm did not always increase the peak levels in the spectrum.

There are several target and environment factors not included in the signal model that could reduce the performance of the algorithm. Target maneuvers could slightly slow down the blade rotation rate and change the fundamental frequency of the rotorcraft. Also, turbulence in the atmosphere caused by nature and downwash from the rotorcraft will affect the frequency, amplitude, and coherency of the signal. See, in this regard, S. L. Collier and a D. K. Wilson, "Performance bounds for passive sensor arrays operating in a turbulent medium: Plane-wave analysis," J. Acoust. Soc. Am. 113, 2704-2718, (2003, hereby incorporated by reference. These effects are difficult to isolate and quantify, but it is expected that they will have an impact on the results. If these effects are large during a processing interval, the results from the algorithm are questionable and should be discarded. One method to determine whether to use the results from the algorithm is to calculate the spectra for data that are motion compensated and for data that are not, and then select the method that has the highest peaks.

For the remaining analysis, any spectra calculated using motion-compensation data that did not increase the peak levels in the $3^{rd}$ harmonic were not included. The $3^{rd}$ harmonic was selected because it had the highest average signal-to-noise ratio and the peak levels are reasonably sensitivity to target motion. In reality, the difference between good and bad data is not a binary decision, so the performance of the algorithm would still be affected by environmental and target factors, even when the algorithm is evaluated using only "good" data.

The amount the algorithm increased the peak levels for the "good" data was analyzed and compared to predicted results. To more equally weight the results calculated at different times, an analysis was performed in dB. The ratio of the peak levels of the harmonics processed with motion-compensated data to the peak levels of the harmonics processed using data that were not motion compensation was averaged in dB for each processing interval duration and harmonic number using $$r_{k,j} = \sum_{i \in I_j} 20 \log_{10}\left(\frac{p_{k,i,j}}{q_{k,i,j}}\right) / |I_j|, \qquad (23)$$

where $p_{k,i,j}$ is the peak value of the $k^{th}$ harmonic, $i^{th}$ processing interval index, and $j^{th}$ processing interval duration index calculated using motion-compensated data, and $q_{k,i,j}$ is the peak value calculated using data that is not motion-compensated, $I_j$ is the set that contains the indices of the good data for the $j^{th}$ processing interval duration index, and $|I_j|$ is its cardinality. These measured results were compared to simulated results.

Simulated data were generated using the output of the frequency tracking algorithm and the models described in (1)-(3) and (8):

$$\xi(n) = \sum_{l=1}^{L} e^{(j\omega_{0,1} l G_{l,P}(n))} \qquad (24)$$

for $n = 0, \ldots, NP - 1$.

where j is the square root of $-1$, $\omega_{0,1}$ is first reference frequency, N=2048, and P=448, the total number of indices for the data processed using a 2.05-s processing interval duration. The peak levels in the harmonics of an ideal signal were compared to the peaks levels of the simulated data. The ratio of the peak levels of the DFT of $\sin(\omega_{0,j}\Delta tnl)$ for n=0, ... NM−1, which is approximately NM, to the peak levels of the DFT of selected segments of $\zeta(n)$, were computed and averaged using (15). These results represent an upper bound (UB) on the increase in the peak levels due to motion compensation for each harmonic in the absence of noise.

The results for motion compensated data, phase gradient autofocus (PGA) algorithm compensated data processed using only the $3^{rd}$ harmonic and their UB are shown in FIG. 4B for four harmonics. The results for the phase gradient autofocus (PGA) algorithm calculated using six harmonics was only marginally better and are not shown.

As expected, the results indicate that for short processing interval durations and low harmonic numbers, motion compensation and phase gradient autofocus (PGA) algorithm had a minimal impact on the peaks levels in the spectrums. As the harmonic number and processing interval duration increased, the average improvement became larger, but the loss in performance relative to the predicted UB also increased. The results for the first harmonic almost achieved the predicted UB. For lower processing interval durations, the results for motion compensated and PGA compensated spectrum for the $3^{rd}$ harmonic occasionally surpassed the predicted UB and do not represent a valid measure of performance. This result for the motion compensated data is probably caused by the noise randomly changing the peak levels in the spectrum. When the noise resulted in a favorable outcome, the data associated with the $3^{rd}$ harmonic were included in the analysis and discarded when it did not. This resulted in a small positive bias. The result for the phase gradient autofocus (PGA) algorithm compensated data for the $3^{rd}$ harmonic is probably higher than the UB due to small levels of noise and interference being adjusted so that they coherently added to the signal. As expected, these biases are not present in the results for the other harmonics.

The results from FIG. 4B indicate that the increase in the peak levels due to motion compensation and the PGA-based compensation almost achieved the predicted UB for the fundamental frequency and the predicted coherent processing gain. The difference between the measured average improvement for the motion compensated data and the UB for the processing interval duration of 12.2 s shown in FIG. 4B is 0.55 dB and slightly better for the PGA compensated data. Motion compensation and PGA-based compensation increased the peak levels in the spectrum more for the higher harmonics, but the differences between these results and the predicted results also increased. The discrepancies are probably due to both target and environmental effects, which defocus the spectrum. Small fluctuations in the rotation rate of the main blades will cause errors in the fundamental frequency estimate, which will reduce performance, particularly for higher frequency harmonics. Also, turbulence in the atmosphere will reduce the coherence of higher frequency signals more than lower frequency signals. For more of a description of turbulent effects, see S. L. Collier and D. K. Wilson, "Performance bounds for passive sensor arrays operating in a turbulent medium: Plane-wave analysis," J. Acoust. Soc. Am. 113, 2704-2718, (2003).

Figure 5:
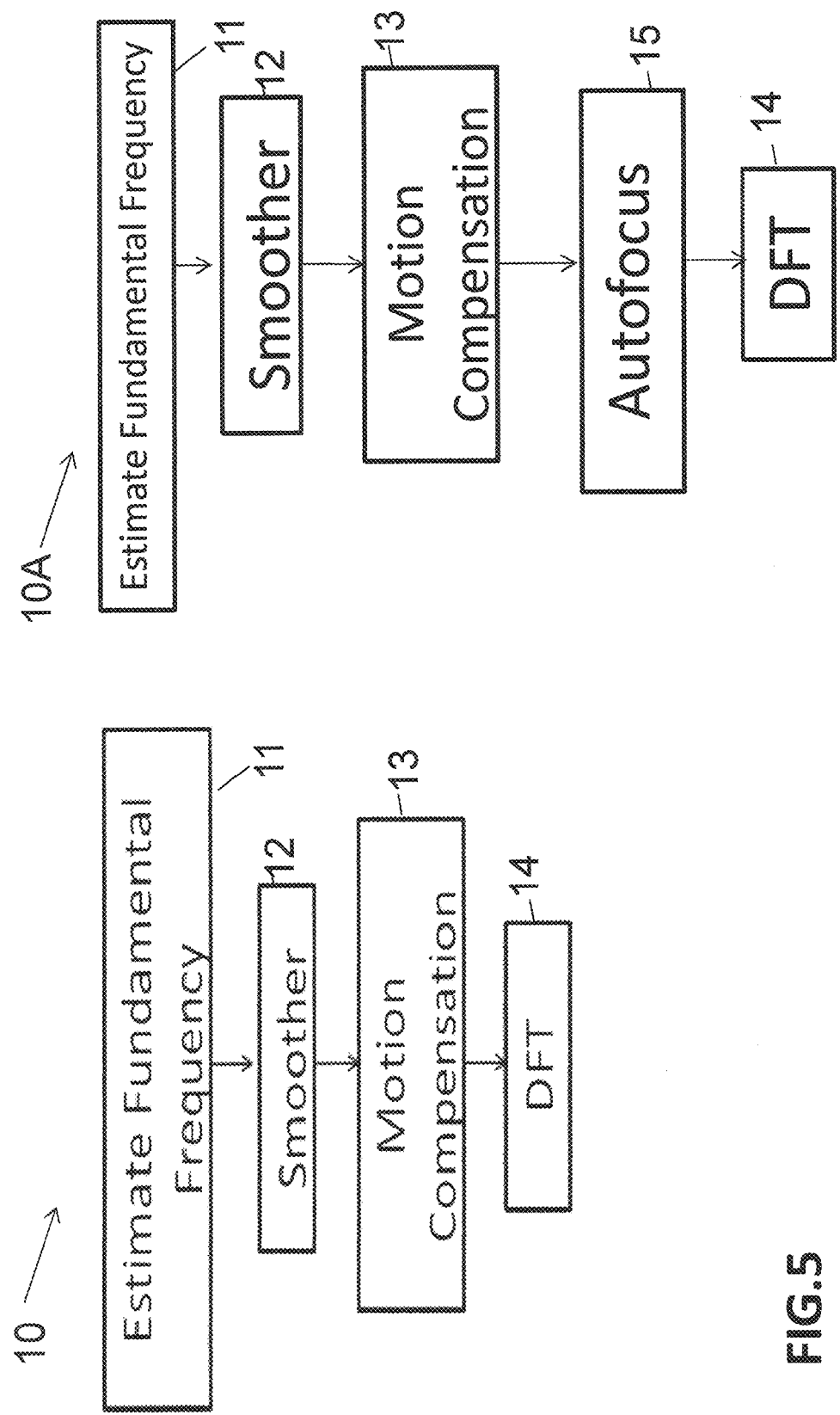
FIG. 5 is an illustration showing the average improvement for motion-compensated and PGA-compensated results calculated for four harmonics using "good" data.
Figure 6A:
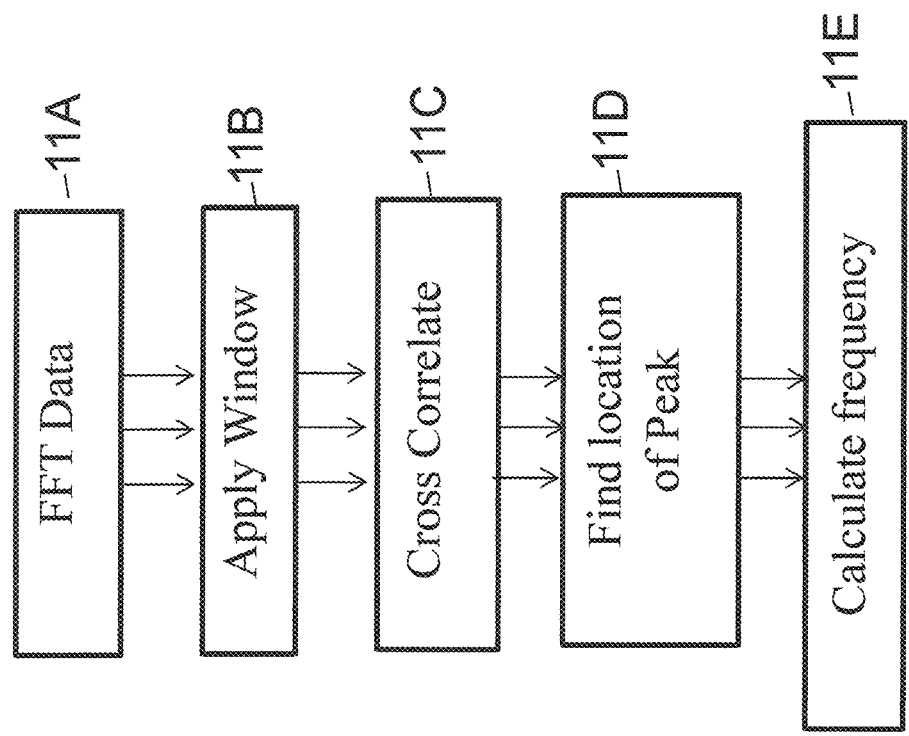
FIG. 6A is an illustrative flow chart for an example of the estimation of the fundamental frequency.
Figure 6B:
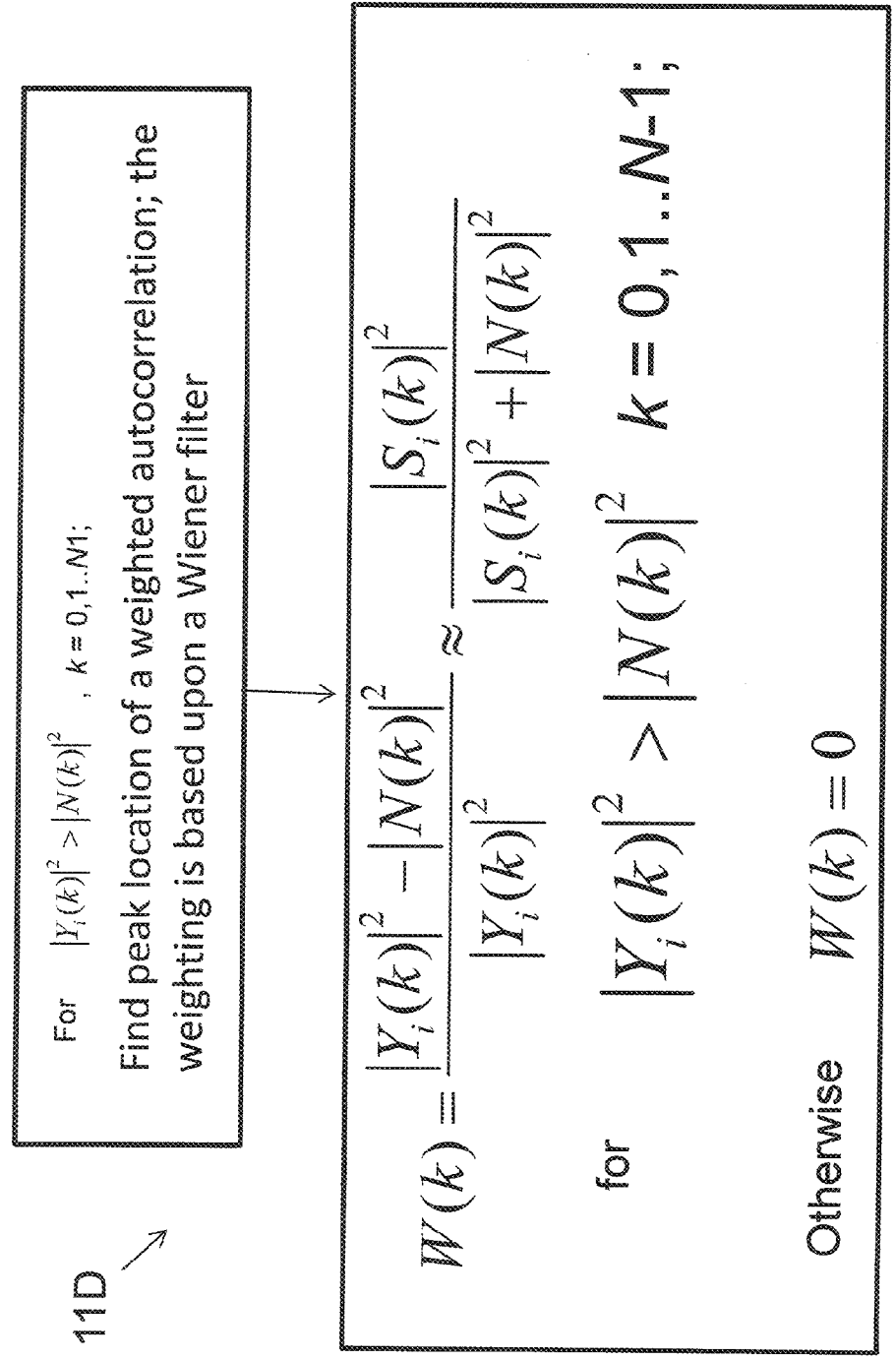
FIG. 6B is an illustration of an example of the finding of a peak location of a weighted autocorrelation the weighting based upon a Wiener filter.
Figure 7A:
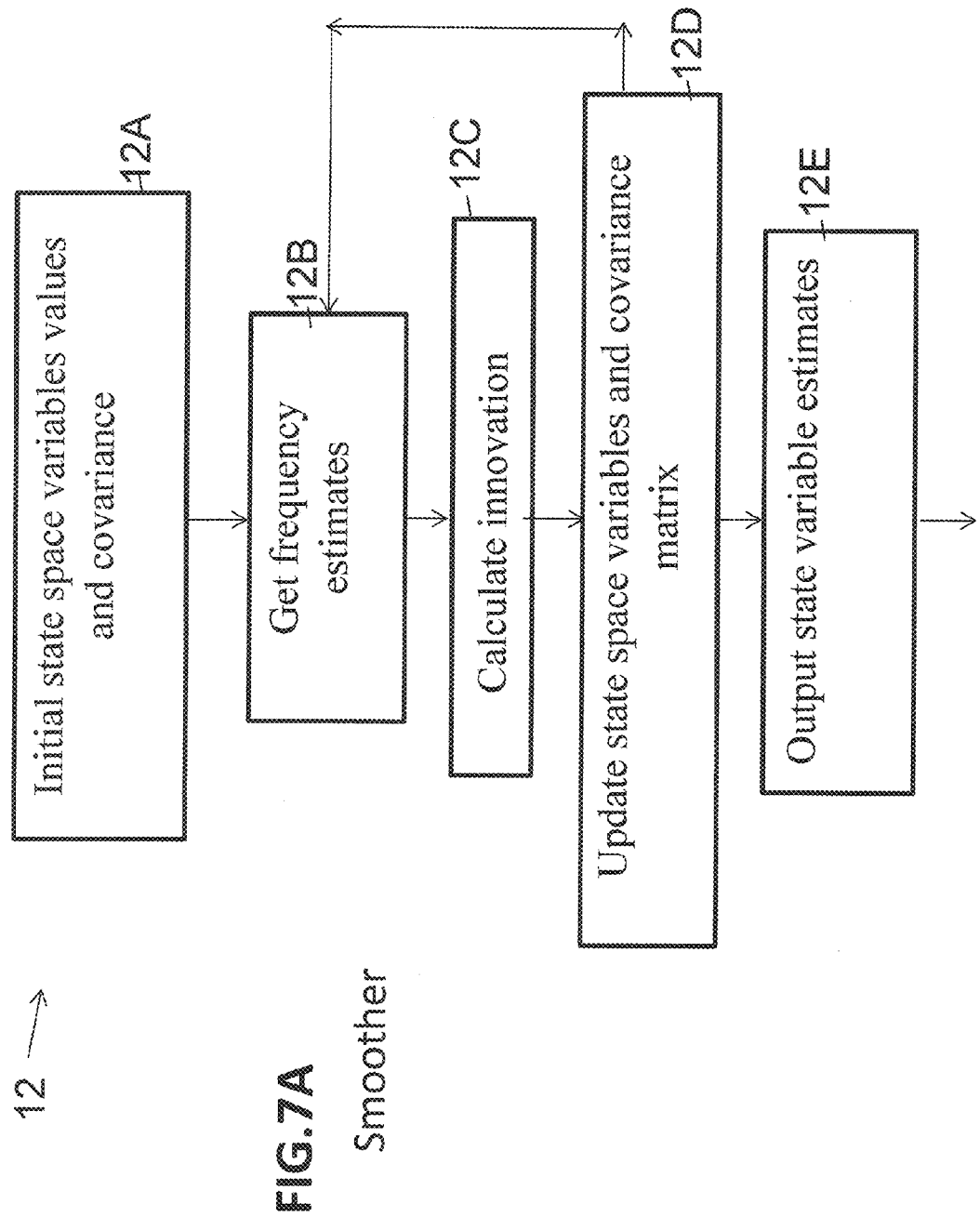
FIG. 7A an illustrative flow chart for an example of the smoothing function of the preferred embodiment.
Figure 9A:
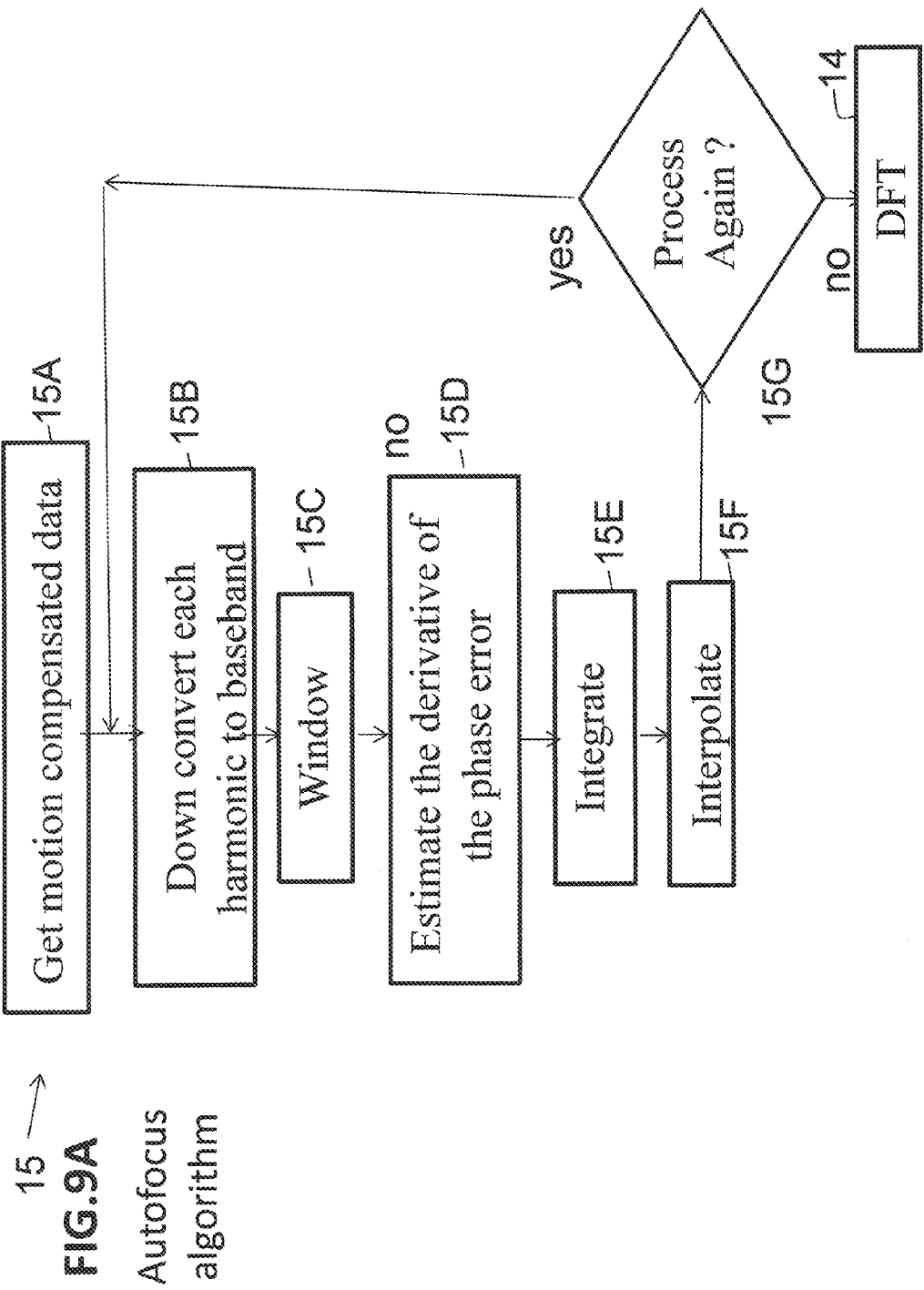
FIG. 9A an illustrative flow chart for an example of the auto focus component of a preferred embodiment.

The discrepancies between the measured and the predicted results were difficult to associate with particular phenomena, but are probably due to fluctuations in the fundamental frequency and amplitude of the signal emitted by the target, errors in the fundamental frequency tracking algorithm, multipath effects, and temporal and spatially varying turbulence. For many scenarios, preprocessing the data using a motion compensating algorithm will focus the signature of the target and allow for longer coherent processing times. This may improve the performance of classification, tracking, and cancellation algorithms FIG. 5 shows a high level block diagram of the algorithm. The first step (box 11) of the algorithm is to track the fundamental frequency of the target. Once a track is established, the estimates can be improved by smoothing (box 12). Next, (box 13) the effect of Doppler shifts on the target signature can be removed by resampling the data. Next, the motion compensated data can be reprocessed using standard algorithms (box 14) such as a discrete Fourier transform (DFT).

The first step (box 11) in the signal processing algorithm is to track the fundamental frequency of the helicopter, which is initially estimated by autocorrelating the spectrum of the helicopter. The location of the peak corresponds to the estimated fundamental frequency. These estimates are input to a third-order Kalman filter. To further improve the estimates of the fundamental frequency, the output from the Kalman filter may be processed using a Rauch-Tung-Striebel (RTS) smoother.

In summary, the spectrum of a rotorcraft was focused using the estimated Doppler shift and an autofocus algorithm. Under good conditions, full coherent processing gain was almost achieved for the fundamental frequency. Peak levels in the higher frequency harmonics improved more than the fundamental frequency, but less than the predicted upper bounds. The discrepancies between the measured and predicted upper bounds are difficult to associate with a particular Phenomenology, but may be due to: (a) fluctuations in the fundamental frequency of the target, (b) fluctuations in the amplitude of the harmonics, (c) atmospheric dispersion, (d) multipath effects, terrain and target. The algorithm can be used as a preprocessor to improve the performance of classification and nulling algorithms.

The above lends open the possibility of the fusion of multiple sensors such as coherent fusion of multiple sensors, as for example: acoustics and radar.

Evaluation criteria included the following. The ratio of the peak levels of the harmonics processed with motion-compensated data and PGA compensated data to the peak levels of the harmonics processed using data that were not motion compensation.

$$r_{k,j} = \sum_{i \in I_j} 20 \log_{10}\left(\frac{p_{k,i,j}}{q_{k,i,j}}\right) / |I_j|$$

where $p_{k,i,j}$ is the peak value of the kth harmonic, ith processing interval index, and jth processing interval duration index calculated using motion-compensated data, and $q_{k,i,j}$ is the peak value calculated using data that is not motion-compensated, $I_j$ is the set that contains the indices of the good data for the jilt processing interval duration index, and $|I_j|$ is its cardinality.

The simulated results are shown in FIG. 11 using simulated data by warping time in the target model $$h(n) = \text{real}\left(\sum_{l=1}^{L} e^{jlvg_{i,j,N}(n)}\right)$$

where $$g_{i,j,N}(n) = \left(n\Delta t \left(\frac{\omega_{0,j}}{\omega_{0,i}} + \frac{B_j}{\omega_{0,i}} n\Delta t + \frac{C_j}{\omega_{0,i}}(n\Delta t)^2\right) + \frac{\Gamma_{i,j}}{\omega_{0,i}}\right) / K_2$$

and $K_2$ is a normalization factor.

Peak levels in simulated spectrum are calculated using $$H(k) = |F(h(n))|$$

and the results are shown in FIG. 11.

As used herein, the terminology "target" means a person or persons, or portion thereof, animal or animals, thing, object, or a combination thereof.

As used herein the terminology "point of interest" or "points of interest" refer to an signature or area in the image which appears to be a target but may or may not be a target; i.e., potentially the point of interest may be a target; subject to further processing or testing.

As used herein the terminology "processor" includes computer, controller, CPU, microprocessor; multiprocessor, minicomputer, main frame, personal computer, PC, coprocessor, and combinations thereof or any machine similar to a computer or processor which is capable of processing algorithms.

As used herein the terminology the terminology "process" means: an algorithm, software, subroutine, computer program, or methodology.

As used herein the terminology "target signature" means the characteristic pattern of a target displayed by detection and identification equipment.

As used herein, the terminology "algorithm" or "subroutine" means: sequence of steps using computer software, process, software, computer program, or methodology.

The foregoing description of the specific embodiments are intended to reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

The invention claimed is:

1. A method for improving the sensing of data associated with a target on a processor comprising:
   estimating the average instantaneous fundamental frequency;
   inputting the average instantaneous fundamental frequency into an algorithm to estimate the state space variables;
   reducing or removing noise from the state space variables describing the fundamental frequency of the target;
   compensating for the motion of the target to obtain motion compensated data;
   focusing the motion compensated data; and
   classify or track signals using the focused and motion compensated data.

2. The method of claim 1 wherein the reducing or removing noise from the average instantaneous fundamental frequency comprises using one of a filter or smoother.

3. The method of claim 1 wherein the focusing of the motion compensated data comprises utilizing a modified phase gradient autofocus algorithm applied to the acoustic signature of a maneuvering rotorcraft.

4. The method of claim 1 wherein the focusing of the motion compensated data comprises using a modified phase gradient autofocus algorithm.

5. The method of claim 1 wherein the step of estimating the average instantaneous fundamental frequency comprises:
   performing a fast Fourier transform on the data;
   applying a window function;
   converting to the time domain;
   applying an autocorrelation function;
   finding a location of a peak; and
   calculating the average instantaneous fundamental frequency.

6. The method of claim 1 wherein the step of estimating the average instantaneous fundamental frequency comprises finding a peak location of a weighted autocorrelation; the weighting being based upon a Wiener filter.

7. The method of claim 1 wherein the removing of noise from the state space variables estimates of the fundamental frequency of the target comprises using one of a Kalman filter or a fixed-lag smoother to improve the estimated fundamental, frequency and further comprises:
   a) initializing state space variables values and covariance in a matrix;
   b) calculating the differences between the estimate calculated using the sensor data and predicted estimate based upon the state space model;
   c) using the calculated differences, updating state space variables and the covariance in the matrix;
   d) repeating steps b) through c) until the estimation of state variables is completed for all of the data from the sensor.

8. The method of claim 1 wherein the noise is reduced or eliminated using a smoother or filter.

9. The method of claim 1 wherein compensating for motion of the target comprises calculating a time warping for removal of the effect of the time varying Doppler shift from the data.

10. The method of claim 1 wherein the compensating for motion of the target comprises:
    obtaining estimates of the state space variables;
    processing multiple intervals of data;
    calculating a phase function;
    concatenating the results;
    calculating time warping.

11. The method of claim 1 wherein the focusing the motion compensated data comprises:
    down converting each harmonic of the motion compensated data to baseband data;
    creating a window function;
    estimating the derivative of the phase error;
    integrating the derivative of the phase error.

12. The method of claim 11 wherein estimating the derivative of the phase error comprises using:

$$\dot{\theta}'_e(t) = \sum_{l=1}^{L} \frac{\text{Im}(\dot{q}'_\omega(t, l) q'_\omega(t, l)^*)}{l |q'_\omega(t, l)|^2}$$

where l is a harmonic number varying from 1 to L, t is time, $q_\omega'(t,l)$ is a complex signal that varies as a function of t and l that has been calculated by down converting the Fourier transform of the data from frequency ω to baseband and windowed using rectangular function converted back to the time domain, then further processed and summed over L harmonics, and where Im denotes the imaginary part, * denotes complex conjugate, • denotes derivative, and | | denotes absolute value.

13. A system for improving data processing of moving target data comprising at least one processor, the at least one processor operating to perform the steps of:
    estimating the average instantaneous fundamental frequency of a moving target;
    inputting the average instantaneous fundamental frequency into an algorithm to estimate the state space variables;
    using state space estimates of the frequency, calculating a time warping that will remove the effect of the time-varying Doppler shift from the data;
    focusing the data using a modified phase gradient autofocus algorithm, and
    classify or track signals using focused and motion compensated data.

14. The system of claim 13 wherein the error reduction subroutine is a fixed lag smoother.

15. A system for improving the sensing of data associated with a target comprising at least one processor, the at least one processor operating to perform the steps of:
    estimating the average instantaneous fundamental frequency;
    inputting the average instantaneous fundamental frequency into a filter or smoother to reduce or remove noise;
    estimating the states and reducing or removing noise;
    compensating for the motion of the target to obtain motion compensated data;
    focusing the motion compensated data; and
    classify or track signals using focused and motion compensated data.

16. The system of claim 15 wherein the focusing of the motion compensated data comprises utilizing a modified phase gradient autofocus algorithm applied to the acoustic signature of a maneuvering rotorcraft.

17. The system of claim 16 wherein the focusing of the motion compensated data comprises using a modified phase gradient autofocus algorithm.

18. The system of claim 16 wherein the estimating the average instantaneous fundamental frequency comprises:
    performing a fast Fourier transform on the data;
    applying a window function;
    applying an autocorrelation function;
    finding a location of a peak; and
    calculating the fundamental frequency.

* * * * *